United States Patent [19]

DeCoene

[11] 4,263,774
[45] Apr. 28, 1981

[54] HAYMAKING MACHINE

[75] Inventor: Frans J. G. C. DeCoene, Zedelgem, Belgium

[73] Assignee: Sperry Corporation, New Holland, Pa.

[21] Appl. No.: 108,330

[22] Filed: Dec. 31, 1979

[30] Foreign Application Priority Data

Jan. 9, 1979 [GB] United Kingdom ............... 00747/79

[51] Int. Cl.³ .............................................. A01D 79/00
[52] U.S. Cl. ................................................... 56/370
[58] Field of Search .......................... 56/370, 192, 13.6

[56] References Cited

U.S. PATENT DOCUMENTS

| 3,896,613 | 7/1975 | van der Lely | 56/370 |
| 3,952,489 | 4/1976 | van der Lely | 56/370 |

FOREIGN PATENT DOCUMENTS

| 1247734 | 8/1967 | Fed. Rep. of Germany . | |
| 408474 | 4/1934 | United Kingdom . | |
| 651995 | 4/1951 | United Kingdom . | |
| 2022387 | 12/1979 | United Kingdom | 56/370 |

Primary Examiner—Jay N. Eskovitz
Attorney, Agent, or Firm—Larry W. Miller; Frank A. Seemar; James R. Bell

[57] ABSTRACT

There is provided a haymaking machine comprising at least one rotor assembly rotatable around a generally upright axis, stationary gear means mounted coaxially with the or each rotor assembly, a plurality of planetary gears rotatably mounted on the or each rotor assembly in mesh with the stationary gear means and rotatable in unison with the associated rotor assembly and a plurality of tine assemblies pivotally mounted on the or each rotor assembly and coupled to the planetary gears eccentrically of their rotational axes so that in operation, in at least one operating condition of the machine, the tine assemblies move from extended, crop-engaging positions to retracted, crop-releasing positions and vice versa.

24 Claims, 22 Drawing Figures

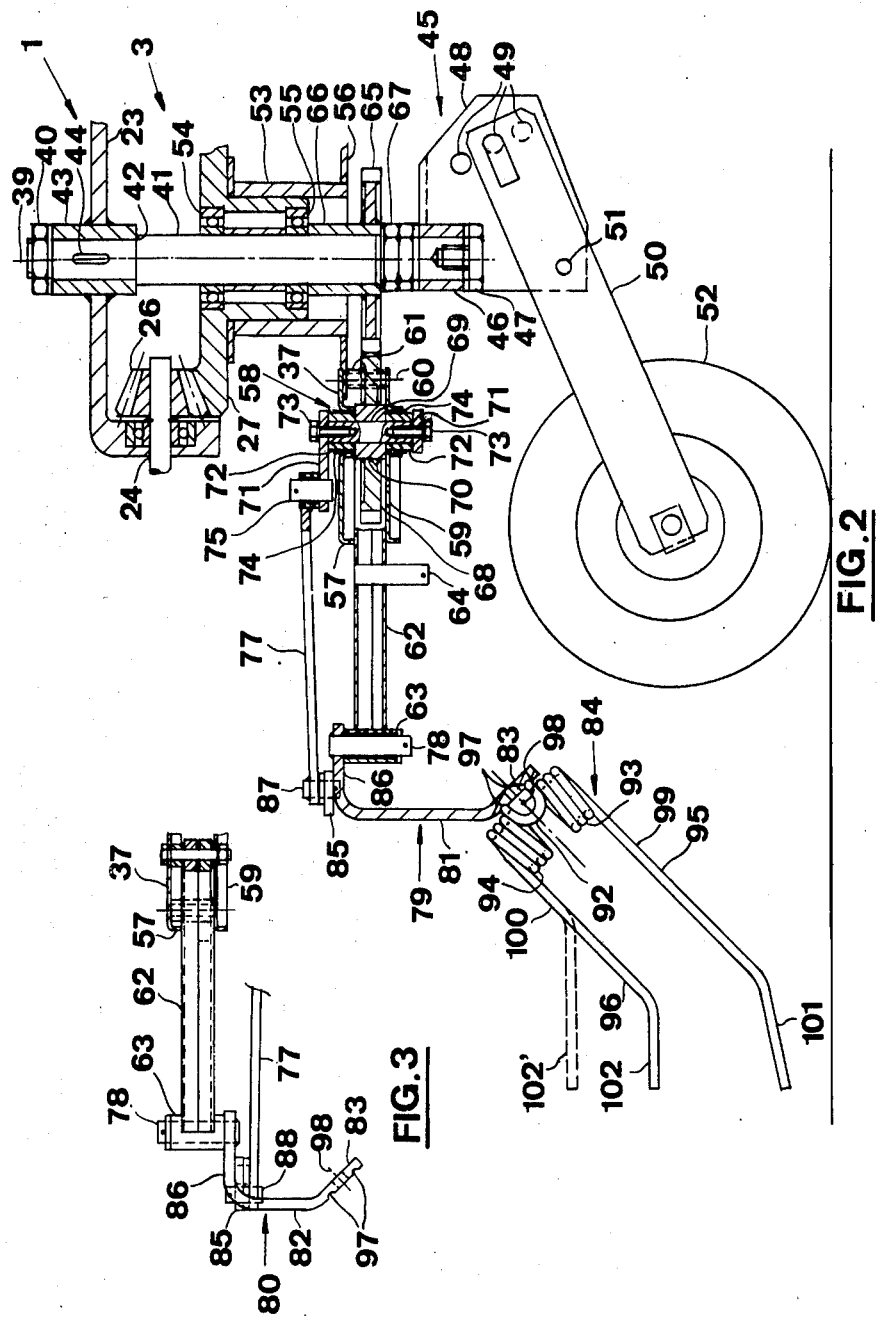

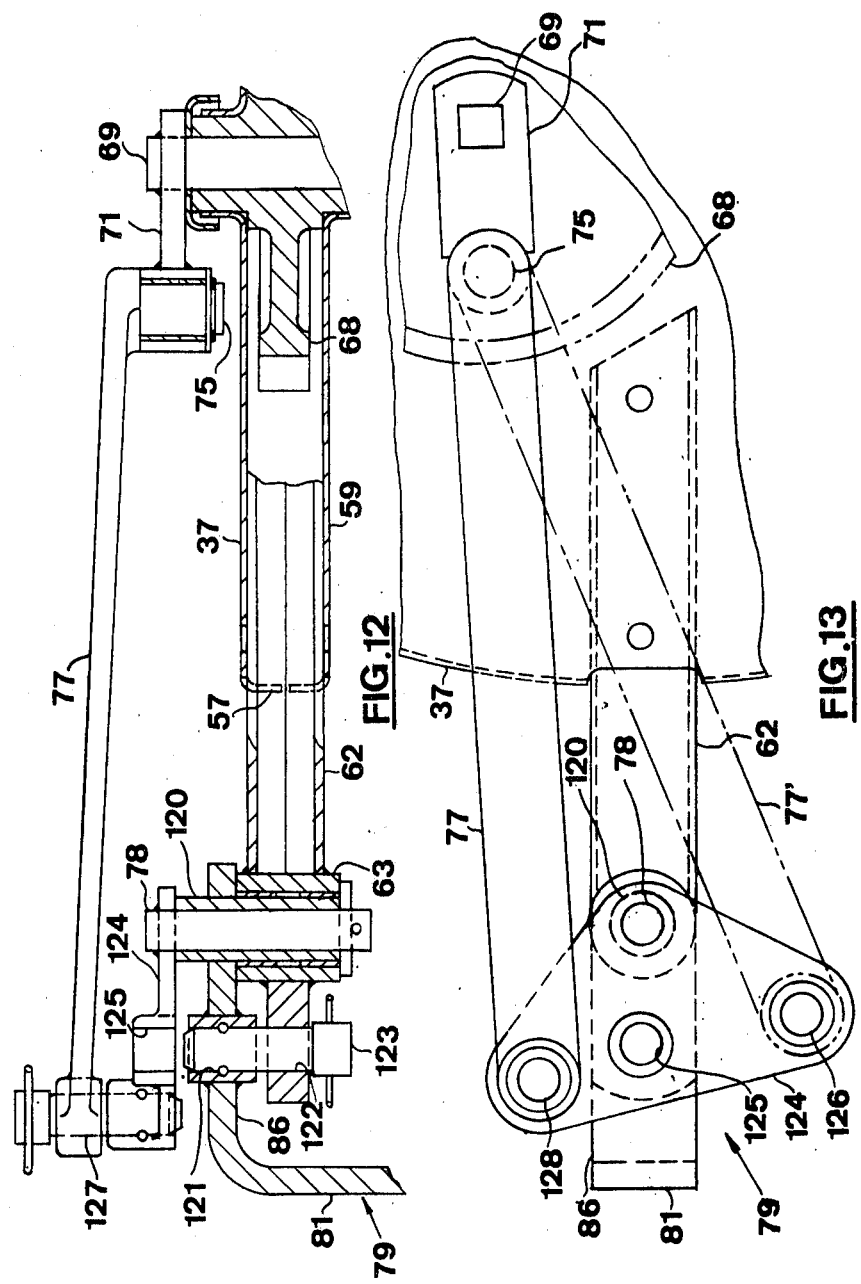

HAYMAKING MACHINE

BACKGROUND OF THE INVENTION

1. Field of the Invention

The present invention relates to haymaking machines for tedding and windrowing crop material such as hay. More precisely, the invention is concerned with haymaking machines of the type comprising one or more rotors which are rotatably mounted about generally upright axes and which are provided with a plurality of crop working elements in the form of flexible tines.

2. Description of the Prior Art

In the haymaking process, crop material usually has to be turned or tedded once or more for proper drying after it has been cut with either a mower or mower-conditioner. Also, prior to being baled, dried crop material has to be raked together in windrows. Single purpose tedding and raking machines are generally known in the art and usually are capable of doing an excellent job. However, single purpose machines have an important drawback in as much as to make good quality hay, two different types of such machines are required, namely a tedder and a rake. Obviously this can make haymaking more expensive and frequent interchange between tractor-mounted machines may be necessary.

Combined machines capable of both raking and tedding crop material (hereinafter called "rake tedders") have gained acceptance mainly as an economical means for accomplishing both jobs. This is especially true in the more humid European countries where hay must be turned and moved more frequently for proper drying. One particular type of rake-tedder is the "cam-actuated" type in which a cam is used in conjunction with a follower to actuate a plurality of equally spaced tine bars that extend radially outwardly from a rotor. As the tine bars cycle with the rotor, the cam follower engages the cam and cause the tine bars to rotate about their axes, causing the tines which extend from the outer ends of the tine bars gradually to move from a crop-engaging position to a raised, crop-releasing position. The cam may have such a profile and be made adjustable that either raking or tedding may be accomplished. The cam is made adjustable so that the position at which the tines release the crop is variable relative to the rotors and direction of travel of the rake-tedder.

In performing the raking operation the tines sweeep an entire swath of crop material into a windrow and then rise, so releasing the crop which is thus deposited in a narrow windrow extending between two laterally spaced rotors. For the tedding operation, the cam is adjusted such that the tines engage the crop material and sweep it outwardly from the centre of the machine spreading it over about the same width as the original swath. In using a double rotor rake-tedder for raking it has been found that a slower rotational speed must be used so as to form an acceptable windrow. Thus to optimise the efficiency of the rake-tedder, it is desirable to provide it with a two-speed input drive means, one input drive being slower than the other to accommodate raking, whilst the faster speed is employed for tedding. Usually, machines of this type accomplish excellent windrowing but leave room for improvement as regards tedding.

For tedding, it is desirable to obtain a much more vigorous action of the tines on the crop material than is the case for windrowing. This is partially obtained with the machine described above by rotating the rotors at a higher speed. In addition, it is desirable to arrange for the tines not to retract from the crop material during operation.

In another prior art machine, this same result is obtained by withdrawing the cam follower from the cam firmly securing the tine bars to the rotor framework, whereby the tine bars are no longer rotated about their longitudinal axes. A drawback of this arrangement is that the tine bars individually must be brought into the tedding position and immobilised in this position. This is time-consuming and it may happen that the operator forgets to reposition and immobilise one or more tine bars which results in the machine malfunctioning. Furthermore, the tines which are left rotating may hit other tines thus causing damage to the machine. Also this repositioning of the tine bars from the tedding position into the windrowing position and vice versa necessitates delicate adjustments.

In another prior art machine of the type described above, the cam follower is urged against the cam by spring means. The tine bars can be brought from the windrowing position into the tedding position by a downward shifting of the cam until the cam follower is out of engagement with the cam. An important drawback with this machine is that in order to bring the machine from the windrowing position to the tedding position and vice versa, it is necessary for the cam to be moved axially along a central shaft. This is disadvantageous because the position of the cam and its rigidity in relation to its support axis determine the trajectory described by the tines during windrowing, and thus the quality of the windrowing performance. Furthermore, the spring means which urge the cam follower into engagement with the cam are continuously stretched and released during operation. This may result in a rapid fatigue of the spring means followed by an appreciable reduction of the quality of machine performance, particularly during the tedding operation when the crop material to be displaced is green and heavy. Also, premature breakdowns may occur.

In all of the above described prior art arrangements the cam follower is in the form of a roller rotatably mounted on a tine bar via crank means. In practice it has been experienced that these cam rollers are fast wearing components which are difficult to design for a longer life without making the cost of manufacture prohibitive. This is a problem which is inherent to the principle of cam-actuated tine bars since the cam follower is moved up-and-down once per cycle of the rotor and as the latter has to be rotated at a relatively high speed, the cam follower is moved up-and-down very abruptly at a corresponding high frequency. This results not only in considerable vibration but also in constant movement relative to the cam.

Other machines have been conceived wherein the tines are pivotably mounted on the rotors and are arranged to move radially outwardly against spring forces under the influence of centrifugal forces. Rake-tedders of this type unquestionably have better tedding characteristics but the windrowing characteristics are less satisfactory. When changing over from the tedding condition to a windrowing condition, the tines must still be adjusted individually and in addition to that, windrow deflectors must be brought into position. Apart from the foregoing drawbacks this type of rake-tedder is simple in design.

Other rake-tedders have been conceived with a view to providing universal machines having both excellent tedding and raking characteristics. Such machines have turned out to be very complicated in design and difficult to adjust. Furthermore such machines usually are relatively expensive.

SUMMARY OF THE INVENTION

It is the object of the present invention to overcome or to attenuate one or more of the foregoing disadvantages and drawbacks of rotor type rake-tedders. More precisely it is the object of the present invention to provide a universal machine with a minimum of components and which is capable of performing all haymaking operations between the mowing and baling operations.

According to the invention a haymaking machine comprises at least one rotor assembly rotatable around a generally upright axis, stationary gear means mounted coaxially with the or each rotor assembly, a plurality of planetary gears rotatably mounted on the or each rotor assembly in mesh with the stationary gear means and rotatable in unison with the associated rotor assembly, and a plurality of tine assemblies pivotally mounted on the or each rotor assembly and coupled to the planetary gears eccentrically of their rotational axes so that in operation, in at least one operating condition of the machine, the tine assemblies move from extended, crop-engaging positions to retracted crop-releasing positions and vice-versa.

Each rotor assembly may comprise generally circular rotatable carrier means mounted coaxially with the stationary gear means and carrying the planetary gears as well as a plurality of generally radially outwardly extending arms which adapt pivotally to support at their outer ends the tine assemblies. The carrier means may be rotatably mounted on a central support shaft which itself supports at its lower end a ground engaging wheel and at its top end a gear housing. The gear housing may contain a ring gear firmly connected to the carrier means and in mesh with a drive pinion to receive driving power for the associated rotor assembly.

Each tine assembly preferably comprises a tine carrier pivotally mounted on an associated arm of the rotor assembly and supporting adjacent its lower end a tine structure. The tine carrier may comprise a pivot pin for pivotally mounting the carrier on the associated arm, a generally downwardly extending leg portion and a lower tine mounting portion, the tine mounting portion being inclined at an angle of the order of 45° to the rotational axis of the rotor assembly. The tine structure is preferably mounted on the tine carrier at an angle of 90° relative to the tine mounting portion thereof so that, when the rotational axis of the rotor assembly is positioned generally vertically, the tine structure assumes an angle of about 45° relative to the ground surface.

The tine structure preferably comprises a pair of tines positioned one above the other, when seen in the direction of the rotational axis of the rotor assembly and oriented generally radially outwardly in at least a portion of the operating cycle. The tines comprise lower ends which are inclined at angles in the range of 70° to 90° relative to the rotational axis of the rotor assembly.

The stationary gear means is preferably angularly adjustable and may comprise one or more gears. Each planetary gear may be coupled to the associated tine assemblies by a pair of connecting rods each of which is pivotally coupled at one end to the planetary gear at a distance from its centre and at its other end to the associated tine assembly at a greater distance from the pivotal mounting thereon on the rotor assembly. The pivotal connections of each pair of connecting rods to the associated planetary gear are angularly offset with respect to each other. In case of ten tine assemblies being provided per rotor assembly, this angular offset is 90° whilst in the case of eight tine assemblies, the offset is 120°.

Preferably, the connecting rods are pivotally coupled to the associated planetary gears via cranks and the cranks associated with each planetary gear may be provided on opposite sides thereof and hence the connecting rods are also on opposite sides thereof. The connecting rods of each pair of connecting rods are thus also coupled to the respective tine assemblies at opposite sides relative to the plane of the planetary gears. Two types of tine assemblies may be provided in alternating fashion with repect to the direction of rotation of the rotor assembly. The first type of tine assemblies comprises longer tine carriers which partially extend above the level of the planetary gears whilst the other tine assemblies comprise shorter tine carriers extending entirely below the level of the planetary gears.

The connecting rods may be detachable from the respective planetary gears and attachable to fixed coupling means on the respective rotor assemblies. The fixed coupling means are so positioned that, when the connecting rods are coupled thereto, the tines assume an outwardly directed position and remain in this position during the entire operating cycle.

In another arrangement, latch means may be provided to hold, when operative, the stationary gear means stationary and, when inoperative, to permit free rotational movement of the gear means. In addition, locking means may be provided to prevent rotational movement of the planetary gears about their respective axes so that when the latch means are inoperative and the lock means operative, the tines remain in fixed positions relative to the rotor assembly during the entire cycle.

In still a further arrangement each tine carrier rotatably supports a crank coaxially with the pivotal mounting of the tine carrier on the rotor assembly. The connecting rod is pivotally attached to the crank means and latch means are provided which are operable in one position to couple the tine carrier to the carrier means of the rotor assembly, and in another position to couple the tine carrier to the crank means, thus coupling the tine carrier to the connecting rod.

BRIEF DESCRIPTION OF THE DRAWINGS

Rake-tedders, constructed in accordance with the present invention will now be described in greater detail, by way of example, with reference to the accompanying drawings, in which:

FIG. 2 is a partial sectional view, to a larger scale, taken along the line II—II of FIG. 1, FIG. 3 is a partial sectional view showing another component of the machine not seen in FIG. 2, FIG. 12 is a sectional view similar to FIG. 11 but illustrating still another embodiment, FIG. 13 is a top view of FIG. 12, FIGS. 14 to 19 are schematic top views of a rake-tedder according to the present invention, illustrating the machine in various operating conditions, and, FIGS. 20 to 22 are schematic views similar to those of FIGS. 14 to 19 but showing still another embodiment of the present invention in various operating conditions.

DETAILED DESCRIPTION OF THE PREFERRED EMBODIMENT

In the following description, right-hand and left-hand references are determined by standing at the rear of the machine and facing in the direction of forward travel which is indicated at 18 in FIG. 1. Also, in the following description, it is to be understood that such terms as "forward", "rearward", "left", "right", "upwardly" and "downwardly" are words of convenience and are not to be construed as limiting terms.

Figure 1:
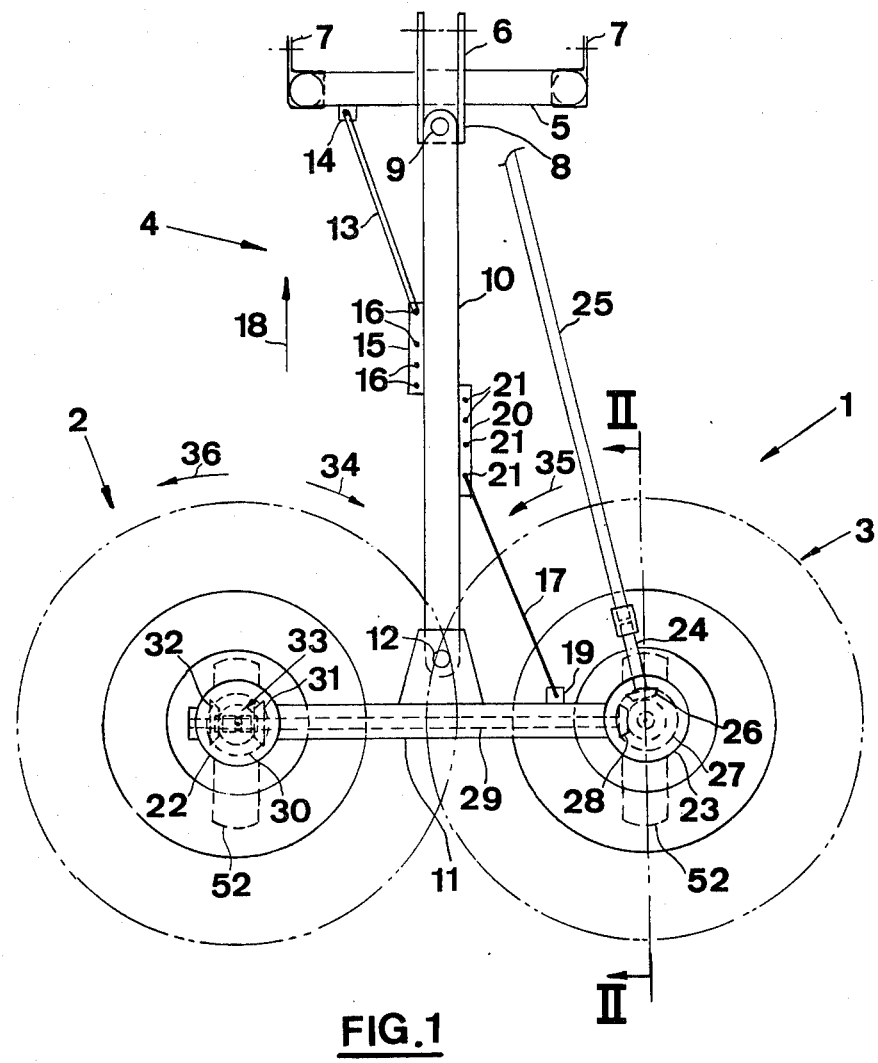
FIG. 1 is a schematic top view of one embodiment of a rake-tedder and having two rotor assemblies.

With particular reference to FIGS. 1 and 2, the rake-tedder 1 comprises a pair of rotor assemblies 2 and 3 which are wheel-supported (FIG. 2) and are pulled through the field by a hitch frame structure indicated generally at 4 and adapted for connection to a conventional three point tractor hitch (not shown).

The front portion of the hitch frame structure 4 comprises a generally U-shaped yoke 5 having a top hitch assembly 6 adapted to connect to an upper centre link (not shown) of the three point tractor attachment. Pivotally secured to the lower outside ends of the yoke 5 is a pair of links 7 which connect the yoke 5 with the lower outside links (not shown) of the three point tractor attachment.

Support means 8 on the yoke 5 are adapted to receive a pivot 9 which connects a main beam 10 of the hitch frame 4 with the yoke 5. The main beam 10 extends rearwardly where it joins a transverse beam 11 via a further pivot 12. The further pivot 12 is positioned generally intermediate the ends of the transverse beam 11. To position and control the lateral movement of the present rake-tedder a lateral positioning link 13 is mounted between the left-hand side of the yoke 5 and an intermediate point on the main beam 10. More particularly, the front end of the lateral positioning link 13 is pivotally secured to a bracket 14 which is mounted on the left-hand side of the yoke 5. The rearmost end of the lateral positioning link 13 is provided for locking the main beam 10 in one of a number of angular positions by means of the bracket 15. To this end, the bracket 15 has a number of locking holes 16. The forwardmost hole 16 is employed to lock the main beam 10 in the transport position such that the rake-tedding device is generally centred behind the tractor and the hitch frame structure 4. The other locking holes 16 are provided for locking the main beam 10 such that the rake-tedding device is positioned in an offset relationship to the tractor.

Mounted between the main beam 10 and the transverse beam 11 is another positioning link 17 for angularly positioning the transverse beam relative to the forward direction of operative travel 18. This link 17 is pivotally secured to the bracket 19 on the transverse beam 11 and can be hooked at its forward end in a number of positions to the bracket 20 on the main beam 10. To this end, the bracket 20 comprises a number of locking holes 21 adapted to receive the hooked forward end of the link 17.

Mounted on opposite ends of the transverse beam 11 and extending outwardly therefrom are left-hand and right-hand gear housings indicated at 22, 23, respectively. The right-hand gear housing 23 comprises an input drive shaft 24 which receives motive power from the tractor PTO (not shown) via a conventional universal joint shaft 25. The input shaft 24 comprises a pinion 26 which is adapted to mesh with a ring gear 27 of the right-hand rotor assembly 3. The ring gear 27 in turn drives a pinion 28 fixed to the right-hand end of a transversely-extending drive shaft 29 rotatably mounted within the transverse beam 11. The motion transmitted to the drive shaft 29 is further transmitted to a ring gear 30 of the left-hand rotor assembly 2 by two pinions 31 and 32. The left-hand gear housing 22 comprises a drive reversing mechanism 33 of which the pinions 31 and 32 form part. As drive reversing mechanisms are generally known in the art, and as drive reversing mechanisms applied on one rotor assembly of a twin rotor rake-tedder are also known in the art, the drive reversing mechanism 33 is shown only schematically in FIG. 1 and will not be described in any further detail. It will be sufficient here to note that in one position the rotor assembly 2 is rotatable in the direction 34 opposite to the drive direction 35 of the rotor assembly 3, whilst in another position the rotor assembly 2 is rotatable in the direction 36 which corresponds to the drive direction 35 of the right hand rotor assembly 3. The drive reversing mechanism 33 may be shifted from one position to another through a handle (not shown) provided on the gear housing 22.

The ring gears 27 and 30 are mounted on the carrier plates 37 of the respective rotary units 2 and 3 in a manner so as to be rotatable about substantially upright axes 38 and 39. Basically the left- and right-hand side rotor assemblies 2 and 3 are of identical construction except for the fact that the right-hand gear housing 23 comprises the input drive shaft 24 and the left-hand gear housing 22 comprises the drive reversing mechanism 33. Also certain components of the left-hand rotor assembly have an additional adjustment possibility compared to the corresponding components of the right-hand side rotor assembly 3. However, this will be described in detail hereinafter.

With particular attention now directed to FIG. 2, the right-hand rotor assembly 3 is shown therein. The gear housing 23 has fixed thereto, by a nut 40, a support shaft 41 which extends downwardly therefrom and generally coincides with the right-hand upright axis 39. The support shaft 41 comprises a shoulder 42 which abuts the underside of a bush 43 welded to the gear housing 23. The nut 40 abuts the bush 43 from above and a key 44 prevents the shaft 41 from rotating in the bush 43.

Rotatably mounted on the bottom end of the shaft 41 is a wheel assembly 45 which includes a bush 46 held in position on the shaft 41 by a bolt assembly 47. Welded to the bush 46 is a mounting piece 48 formed with a series of apertures 49 for locking a wheel arm 50 in any of a number of selected positions for adjustment of the height of the rotor assembly. When adjusting the height of the rotor assembly, the wheel arm 50 pivots about a transverse axis 51. Rotatably mounted about the lower end of the wheel arm 50 is a wheel 52.

The ring gear 27 forms an integral part of a hollow member 53 which is rotatably mounted on the support shaft 41 via a pair of roller bearings 54 and 55. The hollow member 53 supports adjacent its bottom end a flange 56 to which in turn is secured the associated carrier plate 37. Each carrier plate 37 is annular in shape and is formed of sheet metal with turned over edges 57 and holes 58. A further annular sheet metal member 59 of substantially the same dimensions and shape as the carrier plates 37 is secured to each of the latter by means of a plurality of bolt and nut assemblies, one of these assemblies being schematically shown at 60 in FIG. 2. Spacers 61 extend between the carrier plates 37 and the further sheet metal members 59 to hold them at a predetermined distance from each other.

Radially outwardly extending arms 62, which also are made of sheet metal, are secured to the rotor assemblies 2 and 3 between the carrier plates 37 and the further sheet metal members 59. The arms 62 comprise at their outer ends bushes 63 for rotatably receiving components therein which will be described hereinafter. The arms 62 also support mounting pins 64 intermediate their ends. The mounting pins 64 of adjacent arms 62 project in opposite directions in a manner so that alternate pins 64 project alternately upwardly from, and above, the associated arm 62, with the remaining pins projecting downwardly from, and below, the associated arm 62.

A central gear 65 is welded or otherwise secured to a bush 66 which itself is keyed to the support shaft 41 via a nut 67 in a manner so that the gear 65 cannot rotate relative to said shaft 41. Thus the gear 65 is held stationary with respect to transverse beam 11 of the machine.

A plurality of planetary gears 68 is rotatably mounted between the carrier plate 37 and the associated member 59 in mesh with the associated central gear 65. The planetary gears 68 have exactly the same number of gear teeth as the central gear 65. Also, there are only half as many planetary gears 68 as there are arms 62. In the embodiment shown in the FIGS. 2 to 9, ten arms 62 are provided per rotor assembly, which means that per rotor assembly there are provided five planetary gears 68.

Each planetary gear 68 comprises a central hub 70 of square section which fits on a similarly shaped member 69 supporting adjacent its opposed ends a pair of cranks 71. The cranks 71 are welded to bushes 72 with square central apertures therein adapted to be mounted on the member 69. Bolt assemblies 73 adapted to be screwed in threaded apertures in the member 69 are operable to firmly hold the cranks 71 and the square member 69 together.

The planetary gears 68, the member 69 and the cranks 71 are rotatably supported on the carrier plate 37 and associated further member 59 via bushes 74 which are accommodated in the holes 58 in the carrier plate 37 and member 59, and which rotatably support the bushes 72 of the cranks 71.

The cranks 71 associated with one planetary gear 68 are positioned at an angle of 90° relative to each other. The upper cranks 71 comprise an upwardly facing crank pin 75 adjacent their free ends, whilst the lower cranks 71 comprise a downwardly facing crank pin 76 adjacent their free ends. Connecting rods 77 are pivotally mounted at one end on the respective crank pins 75 and 76 and extend generally outwardly towards the vicinity of the extreme outer ends of the arms 62. As each planetary gear 68 comprises two cranks 71, and as five satellite gears are provided per rotor assembly, each such assembly comprises ten connecting rods 77.

The bushes 63 on the arms 62 rotatably support mounting pins 78 for tine carriers 79 and 80. As can best be seen in FIGS. 2 to 6, two different types of tine carriers 79 and 80 are provided with alternate arms 62 having the same type of carrier as seen in FIG. 2. All the tine carriers 79 and 80 have a generally downwardly-projecting leg 81 and 82, respectively, which is firmly secured to the mounting pins 78. The legs 81 of the tine carriers 79 are much longer than the legs 82 of the tine carriers 80 and project downwardly from a position generally above the arms 62 where they are secured to the mounting pins 78. The legs 82 of the tine carriers 80 are shorter and are attached to the associated mounting pins 78 at the lower ends thereof and at a position below the associated arms 62. All the legs 81 and 82 have lower ends 83 positioned at the same level below the associated arms 62 and inclined inwardly at an angle of about 45° to the vertical. Attached to these ends are rake tine structures 84 which will be described hereinafter.

The tine carriers 79 and 80 of the right-hand rotor assembly 3 will now be described in further detail with particular reference to FIGS. 2 to 4, and 7. The tine carriers 79 and 80 all have a mounting arm 85 which trails, as seen in the direction of rotation of the right-hand rotor assembly 3. The mounting arms 85 of the tine carriers 79, i.e. the tine carriers having the longer legs 81 and which thus are secured to the associated mounting pins 78 at the top ends of the latter, define an angle of more than 90° with horizontal portions 86 of the tine carriers 79. The mounting arms 85 of the tine carriers 80, i.e. the tine carriers having the shorter legs 82 and which thus are secured to the associated mounting pins 78 at the bottom ends of the latter, define an angle of less than 90° with the horizontal portions 86 of the tine carriers 80.

The mounting arms 85 support adjacent their free ends a pivot pin 87 or 88 which are alternately directed upwardly and downwardly, the arrangement being such that the pivot pins 87 associated with the tine carriers 79 are directed upwardly and extend above the level of the associated arms 62, whilst the pivot pins 88 associated with the tine carriers 80 are directed downwardly and reach below the level of the associated arms 62.

Pivotally coupled at one end to each pivot pin 87 is the connecting rod 77 mentioned above, and which at its other end is pivotally secured to a crank pin 75. Pivotally coupled at one end to each pivot pin 88 is the connecting rod 77 which at its other end is pivotally mounted on the crank pin 76. It will also be noted that each planetary gear 68 is positioned between a pair of arms 85 and the associated connecting rods 77.

The tine carriers 79 and 80 of the left-hand rotor assembly 2 comprise the same components as the right-hand rotor assembly 3. However, some additional components are provided on top of the left-hand rotor assembly 2. Thus the tine carriers 79 and 80 of the left-hand side rotor assembly 2 each comprise the mounting arm 85 with the pivot pin 87 or 88 thereon. The mounting arms 85 again trail with respect to the associated arms 62 and to the direction of rotation 34 of the assembly 2. Similarly, the pivot pins 87 are directed upwardly and the pivot pins 88 downwardly and have attached thereto connecting rods 77.

In addition to the above described components, the tine carriers 79 and 80 of the left-hand rotor assembly 2 comprise additional mounting arms 89 which in this case lead the associated arms 62 when seen in the direction of rotation 34. The additional mounting arms 89 associated with the tine carriers 79 define an angle of less than 90° with the horizontal portions 86 of the associated carriers 79. The mounting arms 89 associated with the tine carriers 80 define an angle of about 90° with the horizontal portions 86 of said carriers 80.

Figure 9:
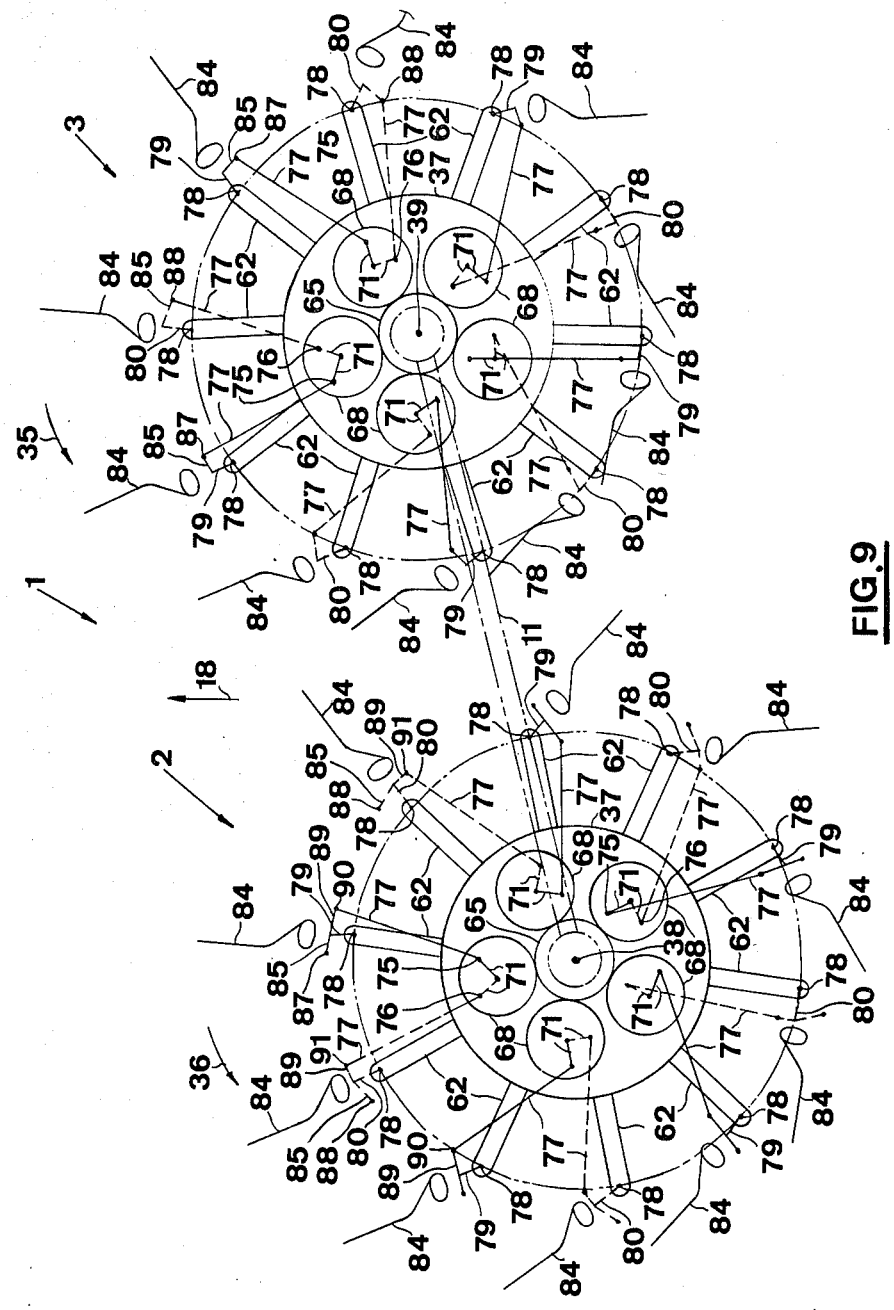
FIG. 9 is a view similar to FIG. 7 but showing the rotor assemblies in the operating condition of FIG. 6.

Each of the additional mounting arms 89 opposite to the mounting arms 85 comprising an upwardly directed pivot pin 87 comprises a further pivot pin 90 which also is directed upwardly. The other additional arms 89 firmly support further pivot pins 91 which are directed downwardly. The connecting rods 77 of the left-hand rotary assembly 2 extending between the crank pins 75 and the pivot pins 87 on the one hand, and between the crank pins 76 and the pivot pins 88 on the other hand, may be mounted between the crank pins 75 and 76 and the respective further pivot pins 90 and 91 an alternative operating mode. However, as will be explained, additonal adjustments have to be made for the machine to function properly in this mode. One of these adjustments concerns the reversing mechanism which should be actuated to drive the left-hand rotor assembly 2 in the opposite direction 36. This alternative position of the connecting rods 77 is shown in FIGS. 5, 6 and 9.

Returning to the rake tine structures 84, it will be seen that each tine carrier 79 and 80 supports a tine assembly composed basically of a central mounting portion 92, a pair of oppositely wound and oppositely directed spring coils 93, 94, and a pair of spring tines 95, 96. The lower ends 83 of the tine carriers 79, 80 comprise a pair of recesses 97, as can be best seen in FIG. 3, to receive sections of the spring coils to prevent pivoting of the tine assembly around the mounting pins which are shown only schematically at 98 in FIGS. 2 and 3.

Figure 5:
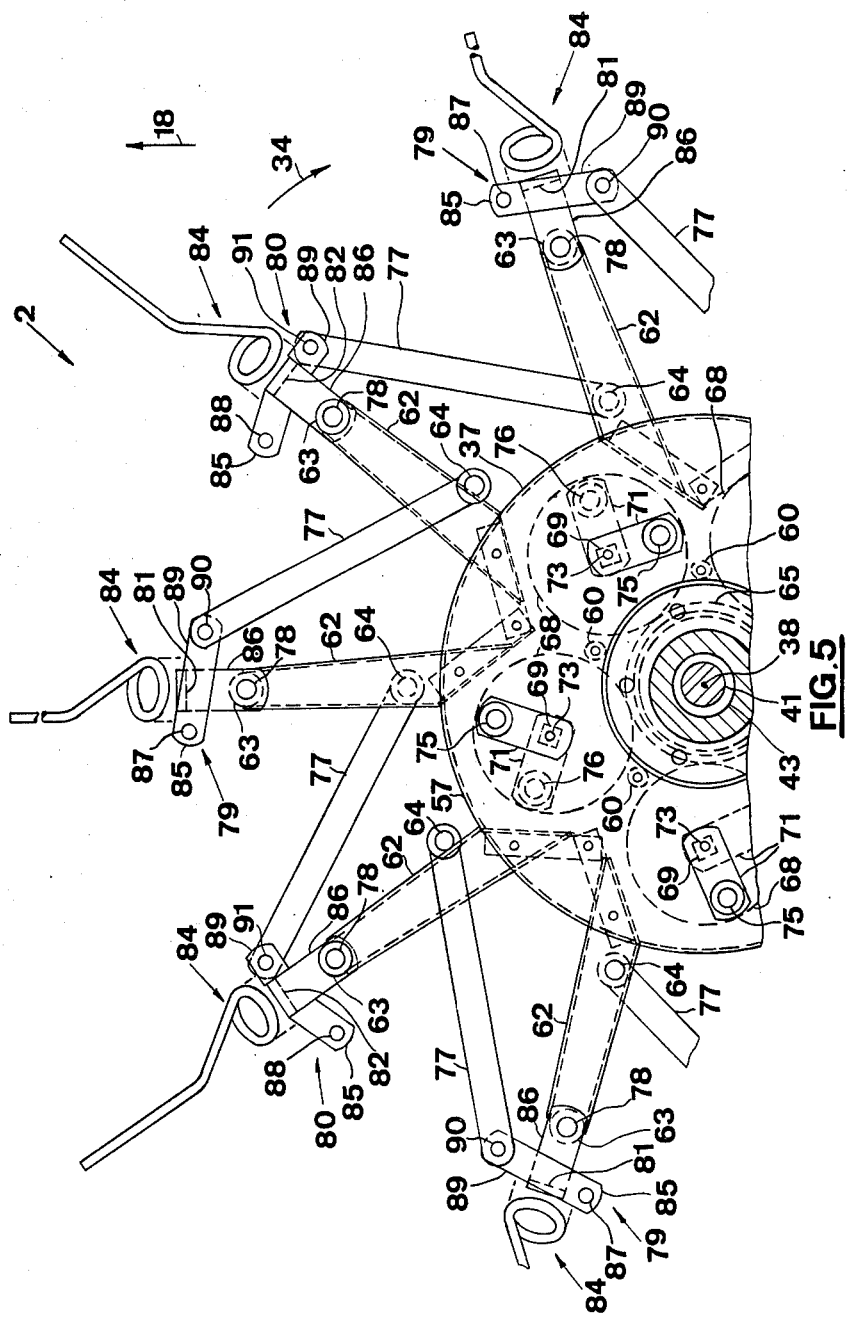
FIGS. 5 and 6 are views similar to FIG. 4 but showing the rotor assembly in other characterising operating conditions.
Figure 6:
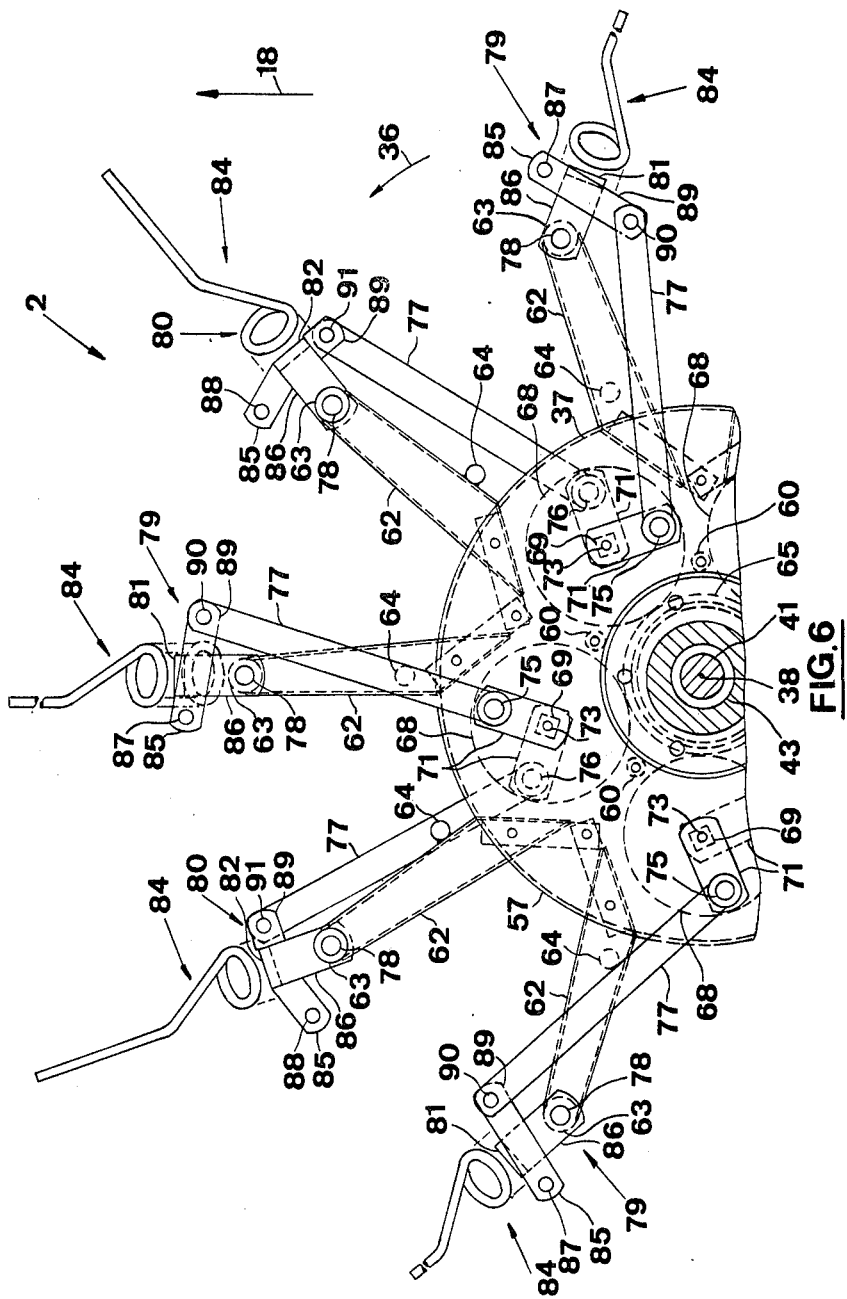
Figure 8:
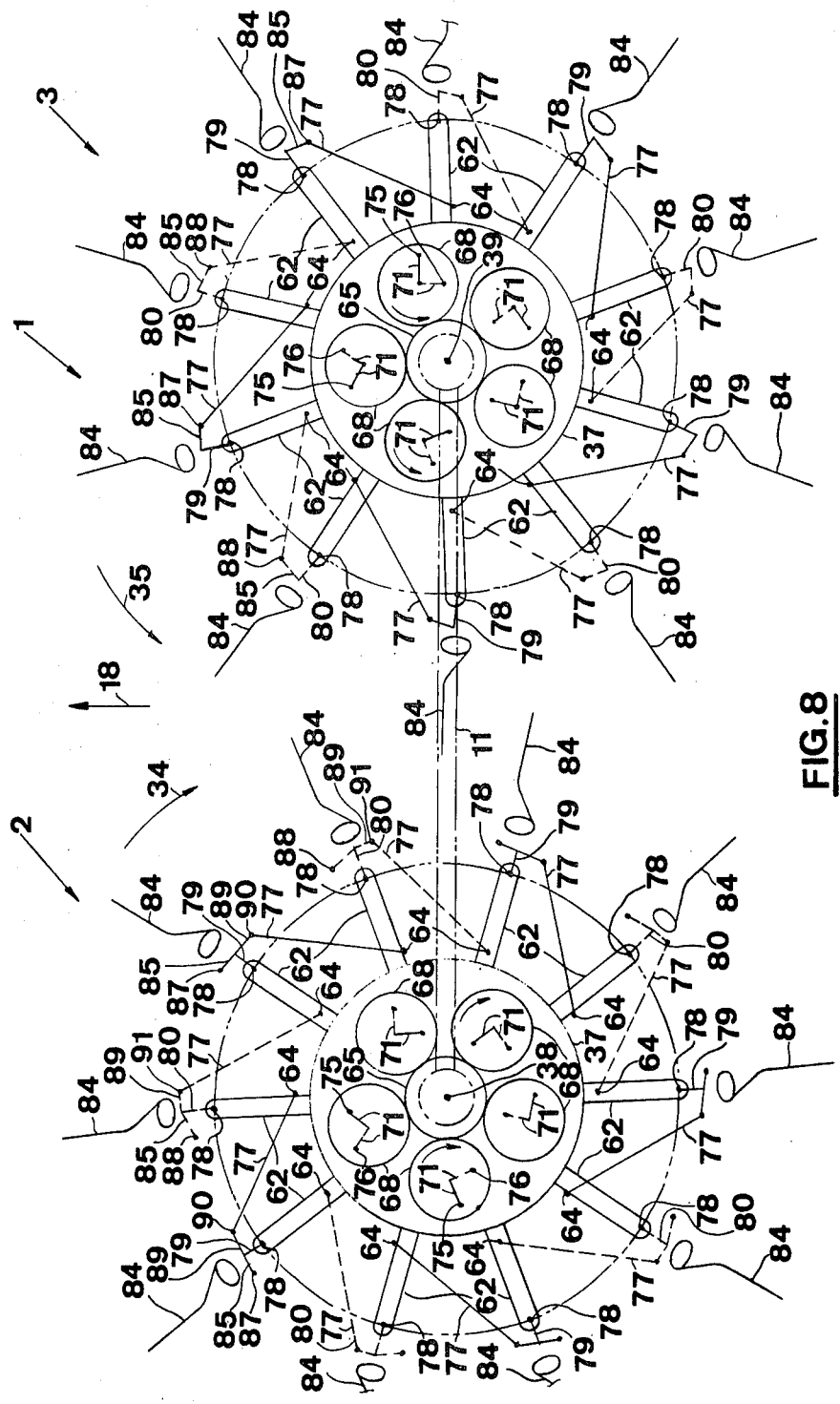
FIG. 8 is a view similar to FIG. 7 but showing the rotor assemblies in the operating condition of FIG. 5.

In the position as shown in FIG. 2, as well as in the positions shown in FIGS. 5 and 8, the spring tines 95, 96 are directed generally radially outwardly relative to the centre of the rotor assemblies 2, 3 and when seen in the direction of the rotational axes 38, 39 of the assemblies 2, 3. Also, as seen in that direction, the respective tines 95, 96 are positioned one above the other. As seen in side elevation, the upper portions 99, 100 of the spring tines 95, 96 define an angle of about 45° with the horizontal (see FIG. 2). The lower end 101 of the lower spring tine 95 of each tine assembly assumes a much flatter inclination relative to the ground, which may be of the order of 10°. The lower end 102 of the upper tine 96 of each tine assembly is generally parallel to the ground. It is further desirable to have the lower ends 102 of adjacent upper tines 96 at different levels above the ground surface. To this end, the upper portion 100 of each alternate tine 96 is substantially shorter than the upper portion 100 of the remaining tines 96. The position of these thus raised lower ends is schematically shown at 102' in FIG. 2. It will also be noted that, as seen in the direction of the axes 38, 39 of the rotor assemblies 2 and 3, the extreme ends of the spring tines 95, 96 are positioned substantially vertically above each other.

The spring tines 95 and 96 of the type described can flex in the direction of the winding of the spring coils as well as in the opposite direction.

OPERATION

In operation, the rake-tedder 1 is attached to the three point hitch of a pulling tractor via its U-shaped yoke 5 and pulled across the field with its wheels 52 running on the ground surface. The rotor assemblies 2, 3 are brought in an offset position relative to the tractor by means of the lateral positioning link 13. This offset position is best illustrated in the FIGS. 14 to 16 and FIGS. 18 and 19. Dependent on the operation that is desired, the rotor assemblies 2, 3 should also be staggered in a fore-and-aft direction or be positioned side-by-side relative to the forward direction of operative travel 18. This adjustment may be accomplished by means of the further adjusting link 17.

Also dependent on the operation that is desired, the rotor assemblies 2, 3 should have their rotary axes 38, 39 almost vertical or tipped forwardly over a substantial angle. To position the rotary axes 38, 39 generally vertically, the wheels 52 are brought closer to the rotor assemblies 2, 3 on the one hand, whilst on the other hand, the top link of the three point tractor hitch is adjusted in length so as to tip said axes in a rearward direction so that they approach the vertical position. Thus the rake tines 95 are moved with their extreme ends along paths which are relatively close, and substantially parallel, to the ground surface. In practice it is often desired to have said paths at an angle of about 5° relative to the ground surface. In other working conditions, the rotor assemblies 2 and 3 should be tipped forwardly over a predetermined angle so that the lower ends of the tines 95 move closely adjacent the ground surface at the forward ends of the rotor assemblies 2, 3 and at a distance above the ground surface at the rearward ends of the rotor assemblies. This is accomplished by lowering the wheels 52 relative to the rotor assemblies 2, 3 and by shortening the top link of the tractor three point hitch. Usually the inclination of the working paths is then in the range of 15° to 20°. This is generally conventional in the art and will not be discussed in any further detail.

The universal joint shaft 25 is coupled to the tractor PTO which is driven at a selected speed adapted to the operation to be performed by the rake-tedder. Basically the rake-tedder according to the invention may be used to accomplish two different types of functions, namely spreading or tedding on the one hand, and windrowing or swathing on the other hand. In practice, however, further functions are possible as will become clear.

Figure 14:
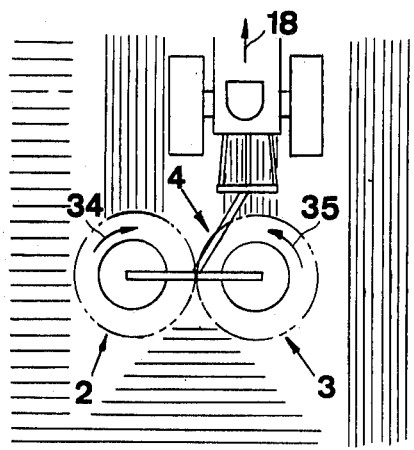

When used as a windrow forming machine, the rotor assemblies 2 and 3 are driven at a relatively low speed with the rotor axes 38 and 39 extending generally vertically or inclined forwardly over a small angle of no more than about 5° relative to the vertical. Central delivery or side delivery windrowing can be effected. The former type of operation is the most common and the most practical if crops with a good yield are being handled. Under these circumstances a single, centrally formed windrow is sufficient fully to load a baler during the subsequent baling operation. This type of operation is illustrated in FIG. 14 and it will be seen therefrom that the transverse beam 11 is positioned generally perpendicular to the intended direction of operative travel and the rotor assemblies 2, 3 and rotated in opposite directions 34, 35 toward each other at their forward ends.

Figure 4:
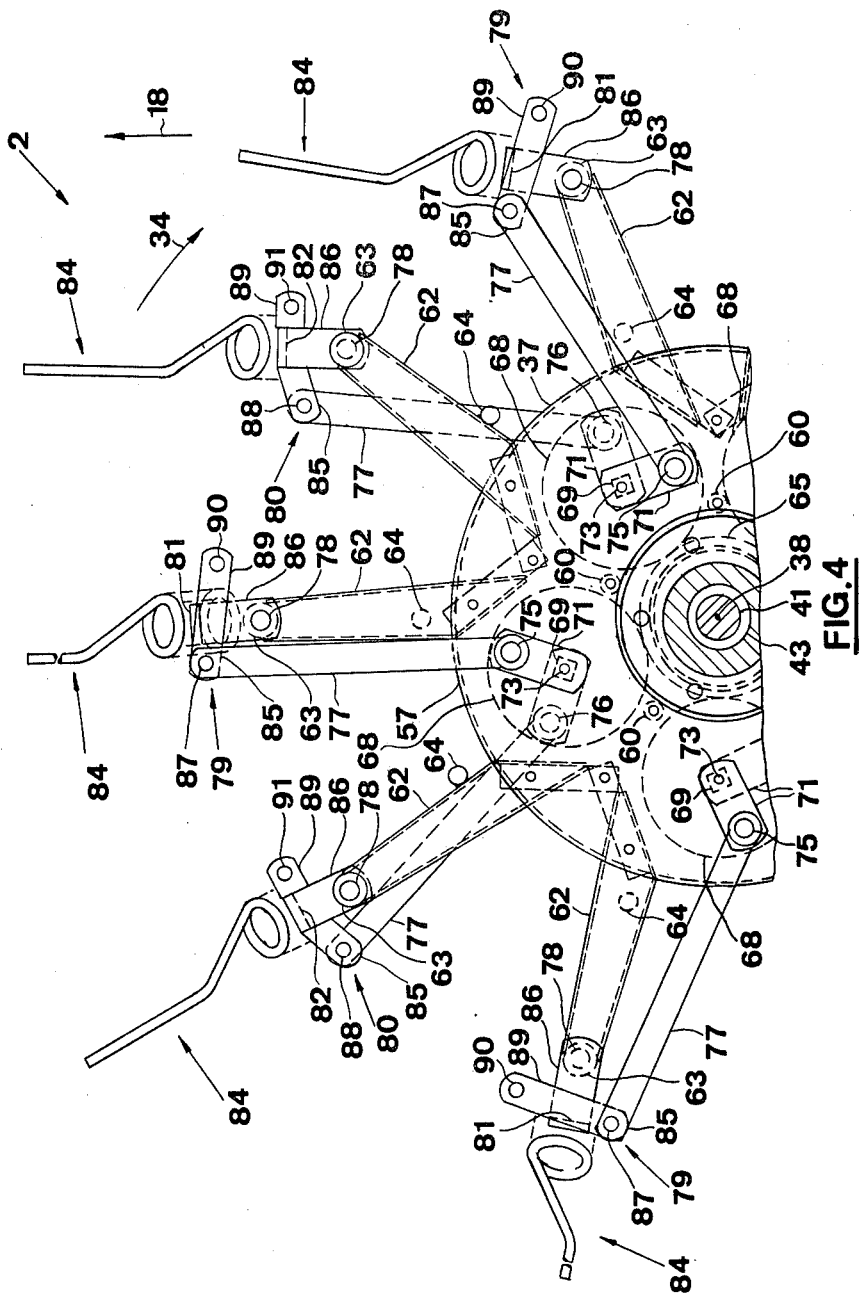
FIG. 4 is a partial top view of the left-hand side rotor assembly of the rake-tedder of FIG. 1, illustrating the rotor assembly in one characterising operating condition.
Figure 7:
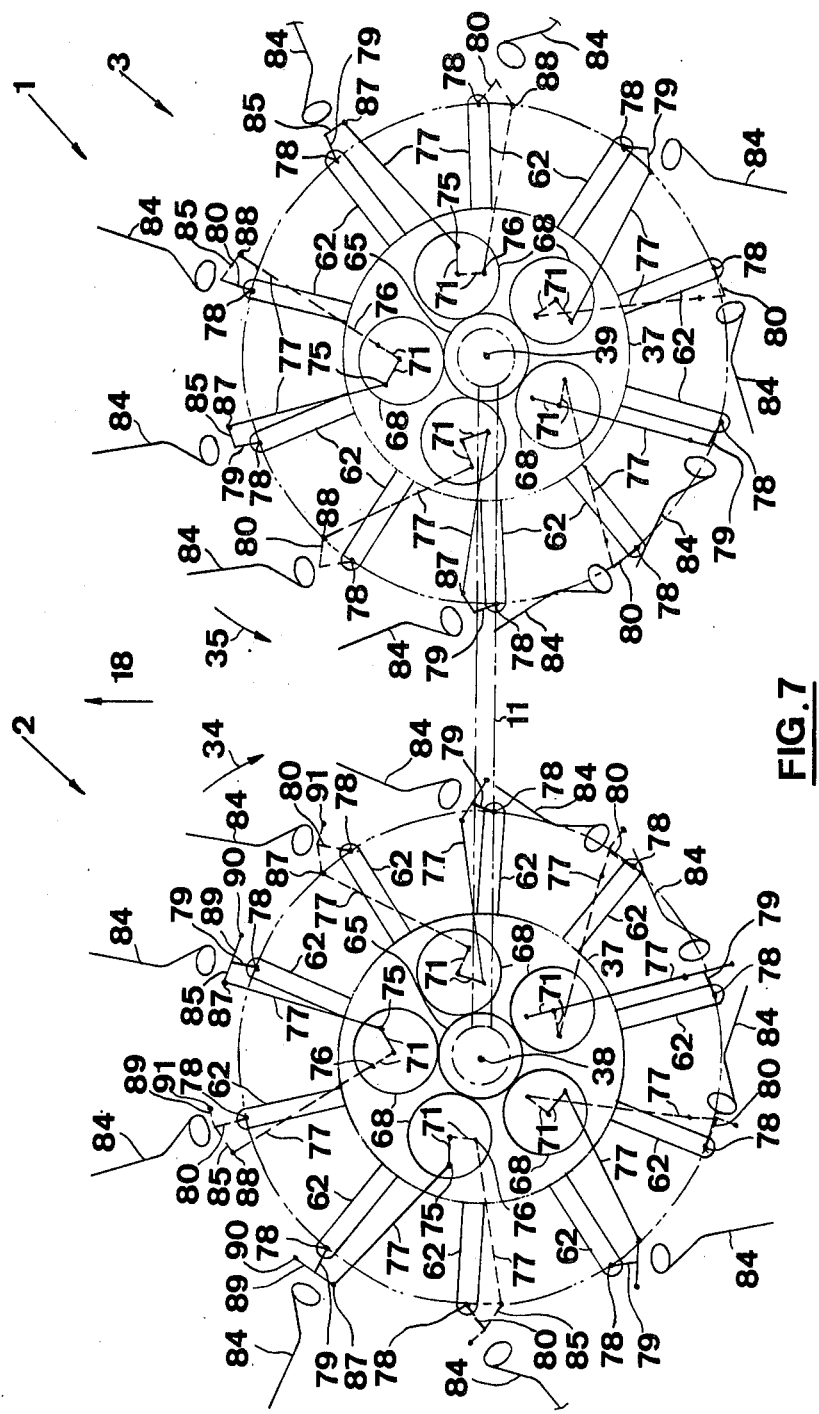
FIG. 7 is a schematic top view of the rotor assemblies of the machine of FIG. 1, with the rotor assemblies in the characterising operating condition as shown in FIG. 4.

The most important setting for accomplishing the above described function is that of the rake tines 95 and 96 relative to the rotor assemblies 2, 3. Therefore, this will now be described in greater detail. The pair of cranks 71 associated with each planetary gear 68 is coupled via a pair of connecting rods 77 to the mounting arms 85 of the tine carriers 79, 80 associated with the arms 62 situated in the vicinity of that planetary gear 68. This setting is shown in FIGS. 4 and 7 and it will seem therefrom that the longer tine carriers 79 are coupled to the respective cranks 71 supporting the upwardly directed crank pins 75 via connecting rods 77 positioned above the associated arms 62. The shorter tine carriers 80 are coupled to the respective cranks 71 supporting the downwardly directed crank pins 76 via connecting rods 77 positioned below the associated arms 62. As will be seen, the mounting arms 85 and the pivot pins 87, 88 thereon trail with respect to the bushes 63 on the associated arms 62 when seen in the direction of rotation 34, 35 of the rotor assemblies 2, 3.

As the carrier plates 37 are rotated in the directions 34, 35 around the supporting shafts 41, the planetary gears 68 are caused to roll over the stationary central gear 65 in the directions 34, 35, respectively, around their own axes. As both the planetary gears 68 and the central gear 65 have the same number of gear teeth, the planetary gears 68 make exactly one full revolution around their own axes as the carrier plates 37 complete a full revolution around the shafts 41. As a result, the time carriers 79, 80 are caused to pivot around their respective mounting pins 78 in the bushes 63 of the arms 62 since the connecting rods 77 couple the carriers 79, 80 to the planetary gears 68.

The distance (D) between the mounting pins 78 and the pivot pins 87, 88 is selected to be somewhat longer than the length (L) of the cranks 71 between its crank pin centre and its pivot axis coinciding with the rotary axis of the planetary gear 68. Thus a full revolution of the cranks 71 will cause the associated tine carriers 79 and 80 to pivot back and forth over an angle of less than 180°. Preferably the dimensions of these components are such that the tine carriers 79 and 80 are oscillated over an angle of 90° or just slightly more than 90° (e.g. 100°). In one arrangement which has been tried successfully ratio of D:L was 70:55. The rake tines 95, 96 are so mounted on the respective tine carriers 79, 80 that in one extreme position of the carriers, the tines extend generally radially outwardly from the respective rotor assemblies 2, 3 when seen in the direction of the rotational axes 38, 39 of said assemblies. This thus also means that the tines 95, 96, as seen in that direction, move to a position generally tangential to the direction of rotation of the rotor assemblies 2, 3 when the tine carriers 79, 80 approach their other extreme position. In the event that the tine carriers 79, 80 pivot over an angle of more than 90°, then the tines 95, 96 move beyond that generally tangential position and thus retract even further. The arrangement is further such that, when the tines 95, 96 approach their tangential position, they trail with respect to the direction of rotation 34, 35 of the respective rotor assemblies 2, 3. In operation, the tines 95, 96 move gradually from one extreme position to the other extreme position and vice versa so that they are directed substantially transverse to the direction of rotation during about one half of the revolution of the rotor assemblies 2, 3, whilst during the other half of the revolution of the rotor assemblies they are positioned generally tangential relative to the direction of rotation of the rotor assemblies or close to said generally tangential direction. In the former half of the operating cycle, the tines 95, 96 engage crop material lying on the ground and sweep it across the ground in the direction of rotation of the respective rotor assemblies 2, 3. In the latter half of the cycle, and as the tines swing backward relative to the direction of rotation of the rotor assemblies and towards the above defined tangential positions, crop material engaged by the tines 95, 96 is released and dropped onto the ground.

In view of the foregoing explanation, one might assume that the planetary gears 68 with the cranks 71 thereon and the tine carriers 79, 80 should be adjusted so that the tines 95, 96 reach their most retracted position at the point where the rotor assemblies 2, 3 face each other, since at this point the windrow should be formed. In practice it has been found that this is not so. Instead, the point of maximum retraction of the raking tines 95, 96 should be positioned substantially beyond the facing points of the rotor assemblies as seen in the directions of rotation 34, 35. Preferably this angular offset of the points of maximum retraction of the tines relative to the facing points of the rotor assemblies is in the range of 45° to 90°. The explanation of this preference is that beyond the point of maximum retraction, the tines 95, 96 start moving outwardly again so that if the above discussed angular offsetting of the point of maximum retraction were not provided, the tines would tend to re-engage a certain amount of crop material and scatter it in a random fashion. This, of course, is contrary to what is desired. Therefore, and to avoid this incorrect operation, the tines 95, 96 should start moving outwardly again at a much later point in the cycle. The above described problem is also partially overcome by the fact that the tine carriers 79 and 80 swing over more than 90°, whereby the most retracted position is even beyond the position which is tangential to the direction of rotation. Thus the tines 95, 96 are in a crop releasing position over a larger portion of the cycle.

With the above described arrangement a clean windrow can be formed without having to install windrow forming deflectors, for example, at a location rearwardly of the crop delivery area of the rotor assemblies. Of course, if windrow forming deflectors were added, this would not harm the operation but they are not essential.

It will also be noted that with the above described setting, the rotor assemblies 2, 3 need not be adjustably mounted relative to each other because sufficient free space is available between the assemblies to deposit therebetween a normal windrow having regard to the manner in which tine retraction is accomplished.

The same machine setting as for a centrally delivered windrow formation can also successfully be used for raking two existing side-by-side windrows into a single, large windrow. This use of the machine is not illustrated in the drawings.

This same machine-setting can also be used for fluffing up and more or less turning an existing windrow. To accomplish this, the machine is pulled across the field so that either the left- or right-hand rotor assembly 2 or 3 is aligned with the existing windrow, whereby under the influence of the tine action of that rotor assembly on the crop material displace the crop material transversely. This use of the machine is also not illustrated in the drawings.

Figure 18:
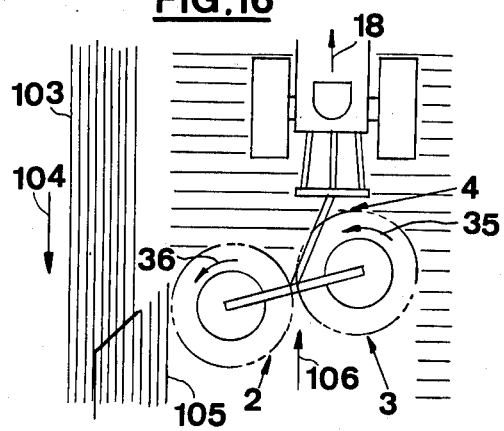

When the crop material has a small yield, it may be desirable to place two windrows together. This is illustrated in FIG. 18. To accomplish this, the rotor assemblies 2, 3 should be staggered relative to each other in the intended direction 18 of operative travel and they should be driven in the one and the same direction. In the arrangement shown, the left-hand rotor assembly 2 is positioned further rearwardly than the right-hand assembly 3. The drive direction of left-hand assembly 2 is reversed by means of the reversing mechanism 33 and is now in the direction 36. A first windrow 103 is made when the machine is moved in the direction 104 across the field and a further windrow 105 is placed on top of the first windrow 103 as the machine is pulled in the opposite direction 106 across the field and alongside the first windrow. Thus, crop material spread over twice the width of the machine is raked together in a single windrow.

The machine setting for this operation is further illustrated in FIGS. 6 and 9. The transverse beam 11 is positioned at an angle of 105° relative to the intended direction 18 of operative travel. The right-hand rotor assembly 3 is adjusted in exactly the same way as it was adjusted for central windrow formation. Thus the rake tines 95, 96 move from an extreme position, in which they are directed substantially radially outwardly, to a further extreme position in which they are fully retracted in a position substantially tangential to the direction of rotation or even somewhat beyond that tangential position. The point of maximum retraction is again between about 45° to 90° beyond the facing points of the rotor assemblies 2 and 3.

The left-hand rotor assembly 2 has to be reset to a certain degree. The connecting rods 77 which were coupled to the respective tine carriers 79, 80 via the pivot pins 87, 88 on the mounting arms 85 have to be coupled to the respective pivot pins 90, 91 on the additional mounting arms 89 at the opposite sides relative to the mounting pins 78. Thus, as seen in the reverse direction of rotation 36 of the rotor assembly 2, the pivot pins 90, 91 and the mounting arms 89 to which the connecting rods 77 are coupled again trail.

As a result of this resetting, the tines 95, 96 retract in a direction which is opposite to the direction of retraction when the assembly is adjusted for central windrowing. Thus the tines 95, 96 again retract in a trailing fashion relative to the direction of rotation 36 so that crop material engaged thereby is released on retraction. Also the tines 95, 96 again move from a first extreme position in which they extend generally radially outwardly (as seen in the direction of the rotary axis 38) to another extreme position in which they are retracted to the maximum and extend substantially tangentially to the direction of rotation 36. More precisely, the lower ends of the tines 95, 96 take this substantially tangential position. The point of maximum retraction is between about 225° and 270° beyond the point of the rotor assembly 2 closest to the assembly 3.

In operation, crop material lying in front of the right-hand rotor assembly 3 is engaged by the tines 95, 96 thereof, swept in a transverse direction to the left, and released in front of the tines 95, 96 of the left-hand side rotor assembly 2. Thus the left-hand assembly 2 takes over from the right-hand assembly 3 and engages that crop material and any other already in its path and moves it to the left and deposits it in a single windrow. Because of the angular offset of the point of maximum retraction of the tines 95, 96 of the left-hand rotor assembly 2, as explained above, no crop material will be carried along behind that assembly.

It will be noted that the side delivered windrow is formed without having to install a windrow forming deflector board. Again, if such a board were installed it would not detract from the operation of the machine but it is not essential as it is in some known machines. Also it will be noted that it is not necessary to bring the rotor assemblies 2, 3 closer together. Indeed, the gap between the tines 95, 96 of the adjacent assemblies 2, 3 which existed when the machine was adjusted for central windrow formation substantially disappears upon setting the machine for side delivery.

Figure 17:
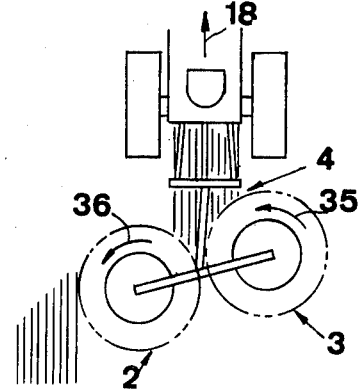

The same machine setting can also successfully be used for fluffing up and turning a single existing windrow. This operating condition is illustrated in FIG. 17 and it will be seen therefrom that the machine is pulled across the field in a manner so that it is centred with respect to the existing windrow. It will also be appreciated from FIG. 17 that to prevent the tractor running over the existing windrow, the machine should be more or less centred behind the tractor.

For spreading or tedding crop material, another machine setting is required. The rotor assemblies 2, 3 are rotated in opposite directions 34, 35 as before and thus deliver crop material centrally. The rotational speed of the assemblies 2, 3 however, should preferably be higher than when windrows are formed. The transverse beam 11 should again be positioned generally perpendicular to the intended direction 18 of operative travel and furthermore the assemblies 2, 3 should be tipped in a forward direction so that in their rearward positions, the tines 95, 96 have their lower ends at a considerable height above ground level, whilst in their forward positions the lower ends move closely above the ground surface so as to grasp crop material lying thereon. To this end, and as already explained, the wheels 52 are lowered with respect to the assemblies 2, 3 and the top link of the tractor three point hitching system is shortened.

The most important setting, however, is again the setting of the tines 95, 96 and this will be described hereinafter. The above outlined working condition can be used for spreading crop material after it has been cut and deposited in swaths by a mower. This situation is illustrated in FIG. 14 and it will be seen therefrom that the machine is pulled across the field with the rotor assemblies 2, 3 aligned with respective swaths.

The same machine setting is also used for tedding crop material which previously has been spread. This operation is not illustrated in the drawings. Furthermore, the same setting may also be used for spreading an existing large windrow. To this end, the machine is pulled across the field with one rotor aligned with the existing windrow. Again, this operation has not been illustrated in the drawings.

The tine setting for the spreading condition will now be described in greater detail with particular reference to FIGS. 5 and 8. It has been experienced, and is generally known in the art, that under most conditions, the best spreading results are obtained when the tines 95, 96 remain in a generally radially outwardly extending position during the entire cycle thereof. In other words, the tines 95, 96 should not retract. To this end, the connecting rods 77 of the right-hand side rotor assembly 3 are mounted between the mounting pins 64 on the arms 62 on the one hand, and the respective pivot pins 87 and 88 of the mounting arms 85 of the tine carriers 79, 80 associated with the next-preceding arms 62, on the other hand. The connecting rods 77 of the left-hand side rotor assembly 2 are installed between, on the one hand, the mounting pins 64 on the arms 62 and, on the other hand, the pivot pins 90, 91 on the mounting arms 89 of the tine carriers 79, 80 associated with the next following arms 62 when seen in the direction of rotation. On both rotor assemblies 2, 3 the mounting pins 64 are so positioned that the tines 95, 96 extend radially outwardly when seen in the direction of the axes 38, 39.

In operation, the radially outwardly extending tines 95, 96 grasp crop material lying on the ground in front of the respective rotor assemblies 2, 3 and carry it along towards the centre of the machine whilst gradually lifting the crop material from the ground. As a result of the increased rotational velocity of the tines 95, 96 the crop material tends to slip off the tines under the influence of centrifugal forces, whereby it is spread more or less evenly over substantially the full width of the machine at the rear thereof. In this condition the planetary gears 68 with the cranks 71 thereon continue to rotate as before but this has no effect on the position of the tines 95, 96.

It will be appreciated that to effect spreading with the machines presently under consideration it is not necessary to bring the rotor assemblies 2, 9 closer to each other as is the case in certain prior art arrangements. Indeed, in the spreading condition the tines 95, 96 extend radially outwardly to an extent that they fully cover the gap between the adjacent rotor assemblies and even have overlapping working paths.

Figure 15:
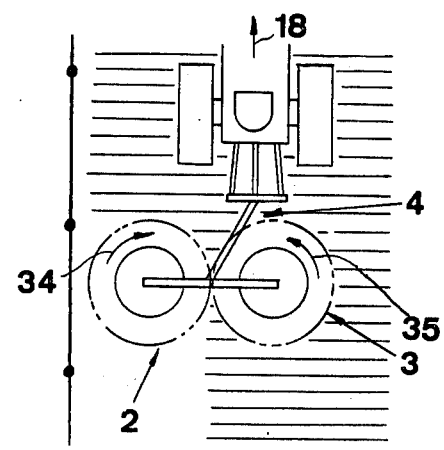
Figure 16:
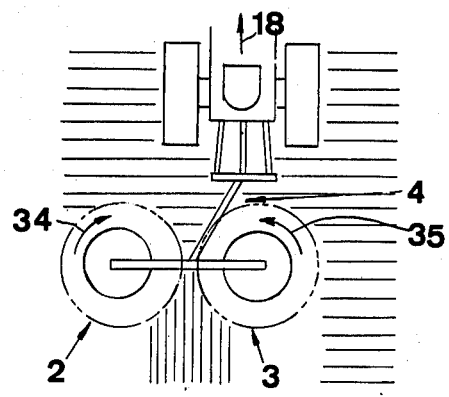
Figure 19:
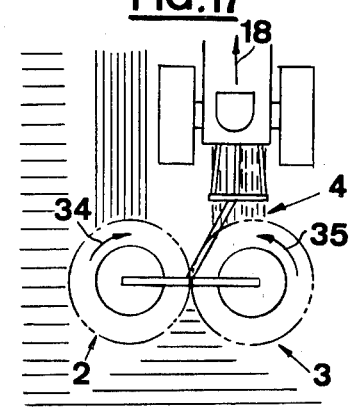

Still other operation conditions are possible as will be described in connection with FIGS. 15 and 19. FIG. 15 illustrates the so-called fence-line raking, whereby crop material is spread and at the same time is raked away from a fence-line, ditch, etc. To this end, the right-hand side rotor assembly 3 is set for spreading or tedding whilst the left-hand rotor assembly 2 is set for windrowing. Crop material engaged by the left-hand rotor assembly 2 is thus deposited on the ground at a location generally rearwardly of the centre of the machine and thus away from the fence, ditch or the like.

It may happen that windrowed crop material which is brittle has, for some reason, to be spread again. Spreading this crop material with the machine in the normal spreading condition may cause unacceptable leaf losses. In these circumstances the crop windrows may be spread with a machine which basically is set in the windrowing condition, but with the following important difference, namely that the offsetting of the point of maximum retraction of the raking tines 95, 96 as defined above is less than 45°. To this end the central gear 65 is made angularly adjustable around the supporting shaft 41. This is not shown in the FIGS. 2 to 9 but may be easily accomplished. It is shown, however, in FIG. 11 and will be described. The spreading action with this machine setting will be more gentle mainly because of the reduced rotational speed of the rotor assemblies 2, 3 and thus less losses will occur. Under these conditions it may happen that the crop is spread over a width which is somewhat less than the full width of the machine because of the more gentle operation. This condition is illustrated in FIG. 19.

ALTERNATIVES

Figure 10:
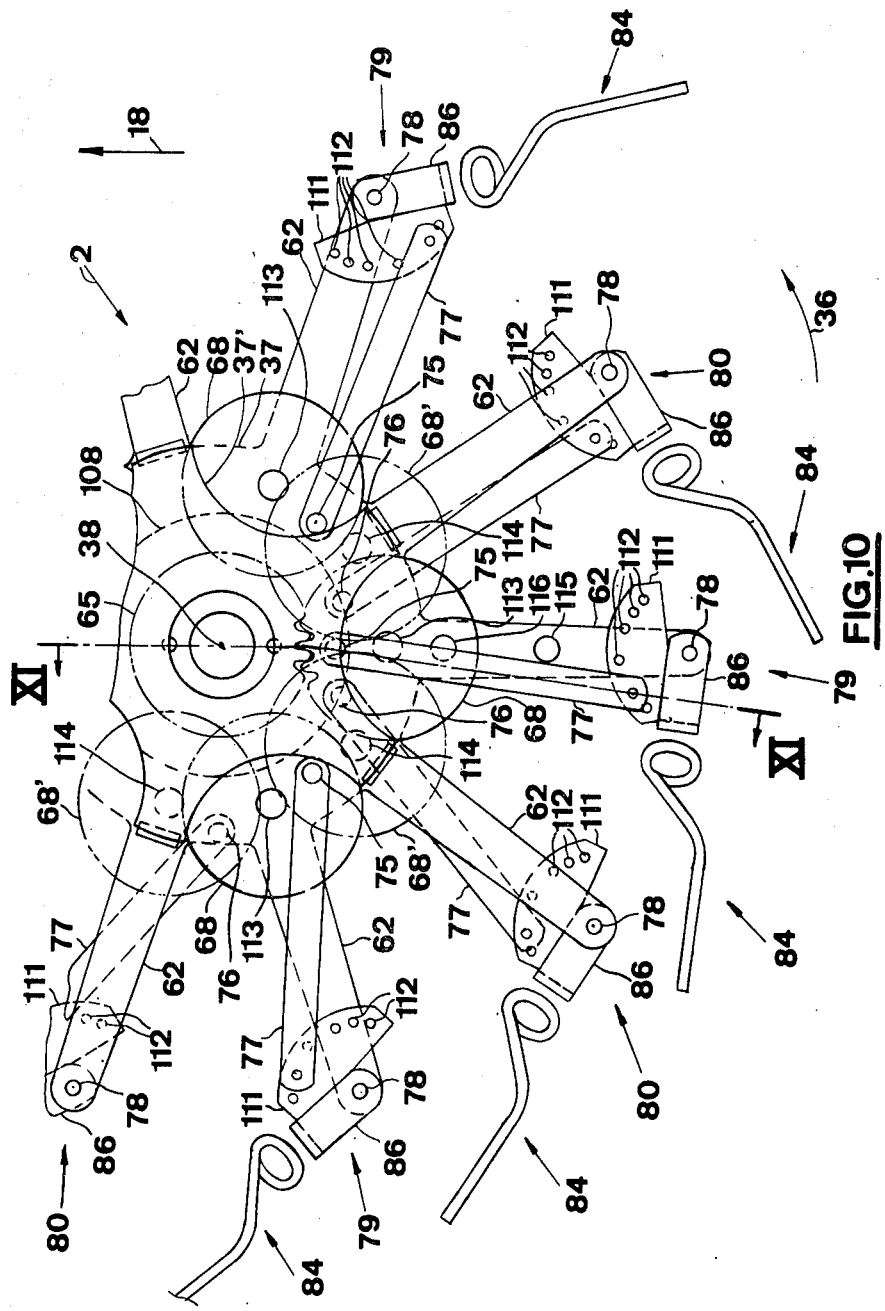
FIG. 10 is a view similar to FIG. 6 but illustrating another embodiment of the invention.
Figure 11:
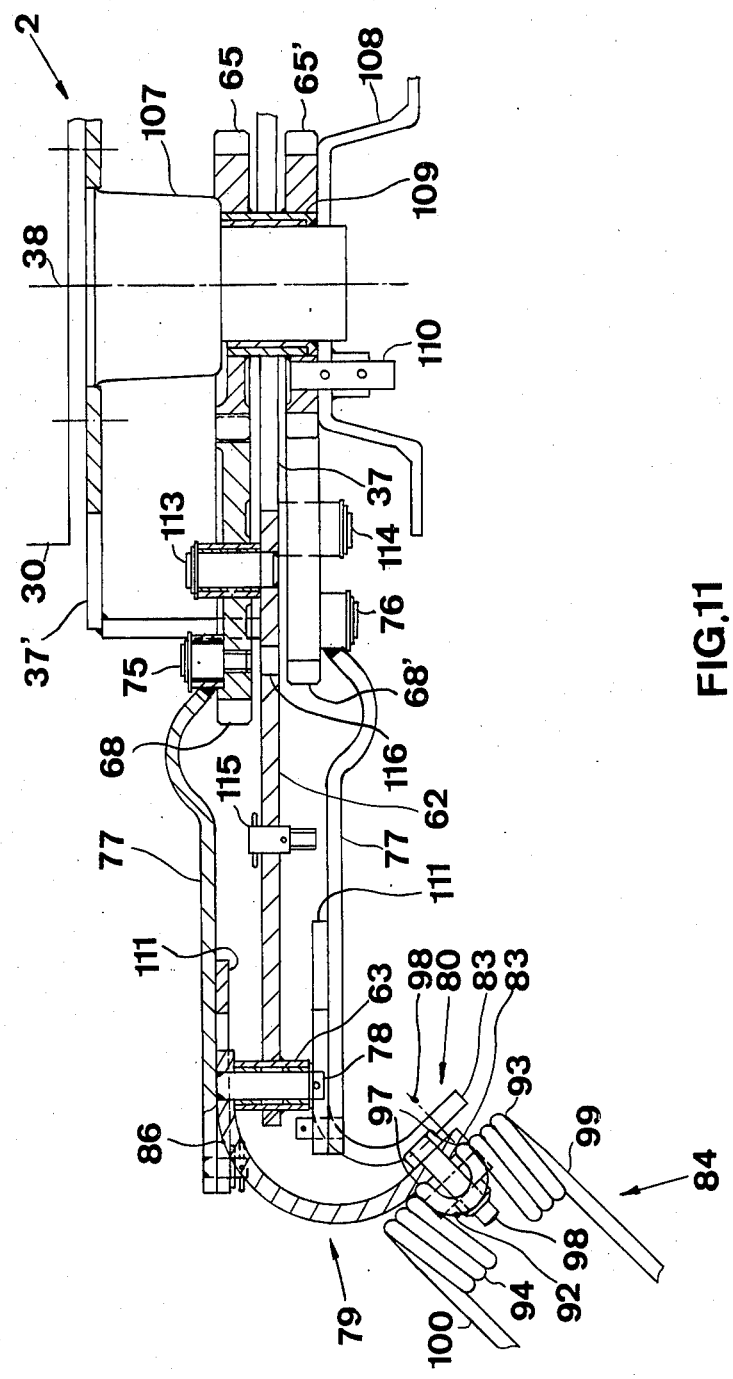
FIG. 11 is a sectional view taken along the line XI—XI of FIG. 10 but with certain components in another position.

With reference to FIGS. 10 to 11 another embodiment of the present invention will now be described, identical components being indicated by identical reference numerals.

In this embodiment each rotor assembly 2, 3 comprises a stationary structure 107 located coaxially with the respective rotary axes 38, 39. In FIGS. 10 and 11 only the left-hand rotor assembly 2 is illustrated. Each stationary structure 107 comprises a flange 108 and a pair of central gears 65 and 65', which are welded or otherwise firmly secured to a bush 109, can be coupled to the stationary structure in a range of angular positions by means of a latch or locking pin 110. The pin 110 passes through the stationary flange 108 and into an aperture in the lower gear 65' of the pair of central gears 65, 65'. Thus in the locked position the central gears 65, 65' are stationary relative to the stationary structure 107, whilst when unlocked, the central gears 65, 65' may be angularly adjusted by being rotated about the respective axes 38, 39 since the bush 109 can pivot about the stationary structure 107.

A carrier plate 37 firmly secured to a carrier structure 37' is rotatably mounted on the stationary structure 107 and carries a ring gear 30 (only schematically shown) receiving driving power. The carrier plate 37 supports a number (ten in this embodiment) of radially outwardly extending arms 62 which comprise at their outer ends supporting bushes 63. Tine carriers 79, 80 are pivotally supported in these bushes 63 via mounting pins 78. As was the case with the embodiment of FIGS. 2 to 9, two types of tine carriers are provided in alternating fashion as seen in the direction of rotation of the respective rotor assemblies 2, 3. One type of tine carrier 79 is coupled to the respective mounting pins 78 from above and has a portion 86 positioned above the extreme end of the respective arms 62 whilst the other type of tine carrier 80 is coupled to the respective mounting pins 78 from below and has a portion 86 positioned below the extreme end of the associated arms 62. Coupling structures 111 having a plurality of apertures 112 provided in an array around the respective mounting pins 78, are welded or otherwise secured to the tine carriers 79 and 80 at the portions 86 thereof and thus extend above and below, respectively, the associated arms 62.

The carrier plates 37 comprise a number (five in this embodiment) of upwardly-projecting stub shafts 113 alternating with an equal number of downwardly projecting stub shafts 114. Planetary gears 68 and 68' are respectively rotatably supported thereon and mesh with the respective upper and lower central gears 65, 65'. Connecting rods 77 are pivotally coupled, on the one hand, to the respective crank pins 75 and 76 and to the associated coupling structures 111 of the tine carriers 79 and 80, on the other hand.

A further latch pin 115 is releasably supported on one of the arms 62 and its function will be described hereinafter.

The principle of operation is identical to the operation of the embodiment of FIGS. 2 to 9. Thus, as the carrier plates 37 are rotated around the respective axes 38, 39, the planetary gears 68 and 68' roll around the respective central gears 65 and 65' and hence rotate about their own axes, whereby, via the connecting rods 77, the tine carriers 79, 80 are caused to pivot in the bushes 63. In this way the tines 95, 96 progressively move from a retracted position to a generally radially outwardly extending position (as seen in the direction of the rotary axes 38, 39) and vice versa.

As shown in FIG. 10, the connecting rods 77 are coupled to the coupling structures 111 adjacent one end thereof (actually the connecting rods are coupled to the structures 111 at the location of the second aperture 112) and as the rotor assembly 2 is rotated in the direction 36, it will be appreciated that this setting corresponds to the setting of the assembly 2 of the first embodiment as shown in FIG. 6. Thus the assembly 2 as adjusted according to FIG. 10 is set for side delivery windrow formation.

For central delivery windrow formation, the connecting rods 77 are coupled to the coupling structures 111 adjacent the other extreme ends thereof.

To adjust the machine for tedding a somewhat different approach is made. The pin 110 is removed whereby the pair of central gears 65, 65' of each rotor assembly 2, 3 can freely rotate about the central stationary structure 107. In addition, the other latch pin 115 is inserted through one of the planetary gears 68, 68' and through an aperture 116 in an arm 62, whereby all gears 68, 68' and the central gears 65, 65' are locked relative to the carrier plate 37 and thus during operation are rotated in unison with said carrier plate 37. As a result, the tine assemblies 84 remain stationary relative to the carrier plate 37 during rotation of the latter. Having made these two adjustments, it will be appreciated that some tines 95, 96 will be positioned in a generally radially outwardly extending position whilst others will assume another position, some of which will be fully retracted. Therefore a third adjustment is required. All the tine carriers 79, 80 are coupled to the respective connecting rods 77 so that with the planetary gears 68, 68' locked in various angular positions, all the tines 95, 96 nevertheless are oriented radially outwardly.

It will also be appreciated from what precedes that with the multiple adjustment possibilities of the tine carriers 79, 80 the orientation of the tines 95, 96 for all operating conditions may be adjusted. Furthermore, with the possibility of angularly adjusting the position of the central gears 65, 65' relative to the stationary structure, it is possible to adjust the point of maximum retraction of the tines 95, 96. This is useful for adjusting the machine in a transport position with a minimum transport width. The central gears 65, 65' can be angularly adjusted so that at the opposite side ends of the machine the tines 95, 96 are at their point of maximum retraction thus reducing the total machine width to a minimum.

Turning now to FIGS. 12 and 13 a still further embodiment of the invention will now be described. In the embodiment of FIGS. 2 to 9 and FIGS. 10 and 11 it is necessary, in order to change the machine from one operating condition to another, to disconnect the connecting rods 77 at one or both of their ends and to attach those rods to other components of the rotor assemblies 2, 3. This can be time consuming and result in maladjustment but the arrangement of FIGS. 12 and 13 overcomes this.

Again, similar components are indicated by identical reference numerals and it should be noted that FIGS. 12 and 13 illustrate part of the left-hand rotor assembly 2. As in the first embodiment, two types of tine carriers 79, 80 are provided. However, contrary to the first embodiment, the tine carriers 79, 80 according to the embodiment presently under consideration are welded to bushes 120 which themselves are rotatably mounted in the bushes 63 on the arm 62, on the one hand, and which, on the other hand, rotatably support the mounting pins 78. The horizontal portions 86 of the tine carriers 79, 80 comprise a locking aperture 121 which can be aligned with a locking aperture 122 in the associated arms 62. A latch or locking pin 123 can be inserted in a pair of locking apertures 121 and 122 when they are aligned with each other. Thus the tine carriers 79, 80 assume a fixed position relative to the respective arms 62.

Welded to each mounting pin 78 is a crank 124 which also comprises a locking aperture 125 and which can be aligned with the locking aperture 121 in the corresponding tine carrier 79, 80. The locking pins 123 can be removed from the respective apertures 121 and 122 and inserted in the locking apertures 125 and 121 so as to lock the cranks 124 with the tine carriers instead of locking the arms 62 with the latter. Thus the tine carriers 79, 80 can now pivot relative to the arms 62.

Each crank 124 of the right-hand rotor assembly 3 comprises a single further aperture 126 for pivotally receiving the pivot pin 127 of the associated connecting rod 77. Each crank 124 of the left-hand rotor assembly 2 comprises a pair of spaced apertures 126, 128 for pivotally receiving the pivot pins 127 of the associated connecting rods 77 in one or other of the apertures as required.

In the arrangement as shown in FIG. 12, the components are adjusted for spreading or tedding action. This means that all tine structures 84 (not shown) are oriented generally radially outwardly when seen in the direction of the axes 38, 39. As already mentioned, in this position the tine carriers 79, 80 are firmly coupled to the respective arms 62 by means of the locking pins 123 which are inserted through the locking apertures 121, 122. In this condition, the pivot pins 78 are freely pivotable in the bushes 120 of the tine carriers 79, 80 and rotation of the carrier plates 37 results in the gears 68 rotating about their respective axes and the crank means 124 pivoting about the pivot pins 78 via the connecting rods 77. This has no effect, however, on the position of the tine structures 84.

To change the machine to a central delivery windrowing condition, the only adjustment required of the rotor assemblies 2, 3 is the following: the locking pins 123 have to be removed from the locking apertures 121, 122 and inserted in the locking apertures 125, 121 so as to couple the tine carriers 79, 80 to the cranks 124 and render them freely pivotable relative to the arms 62. Thus, there is no requirement for the connecting rods 77 to be detected and re-connected as in the earlier embodiments which reduces the liklihood of maladjustment.

In order to change the machine from a central delivery windrowing conditions to a side delivery windrowing condition, the connecting rods 77 of only the left-hand side rotor assembly 2, 3 should be disconnected at one end from the cranks 124 and re-coupled thereto at the location of the further apertures 128 so that in operation the tine carriers 79,80 pivot in an opposite direction around the pivot pins 78. This position of the connecting rods is shown in full lines in FIG. 13 with the former position being shown in broken lines at 77'.

Figure 20:
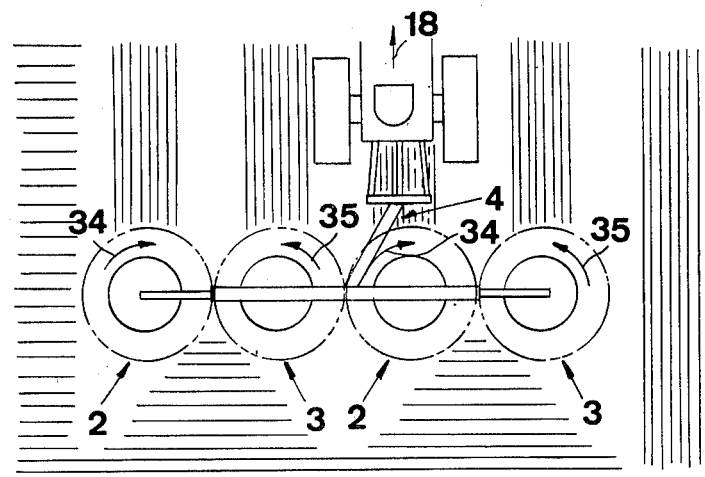

Some further alternative arrangements will now briefly be described. With reference to the FIGS. 20 to 22 it will be clear that the present invention is not restricted to a twin rotor rake-tedder but is also applicable to such a machine having four or even more rotors. In FIG. 20 a four-rotor rake-tedder is shown in the spreading condition wherein four swaths, as cut by a mower, are equally spread behind the machine. The four rotor machine in fact is composed of two twin-rotor assemblies located alongside each other and thus the setting of each pair of rotors corresponds to the setting of a twin rotor machine already described.

Figure 21:
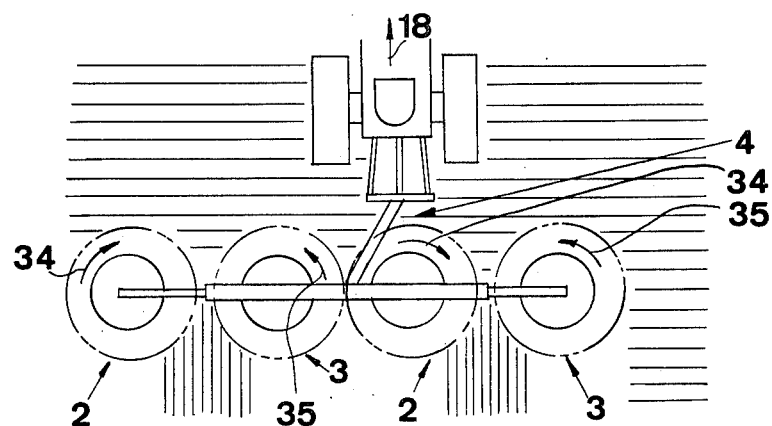

In FIG. 21 a four rotor machine is shown in a windrowing condition for forming a pair of windrows during one and the same run. Again the setting of the components of each pair of rotor assemblies corresponds to the setting of a twin rotor machine.

Figure 22:
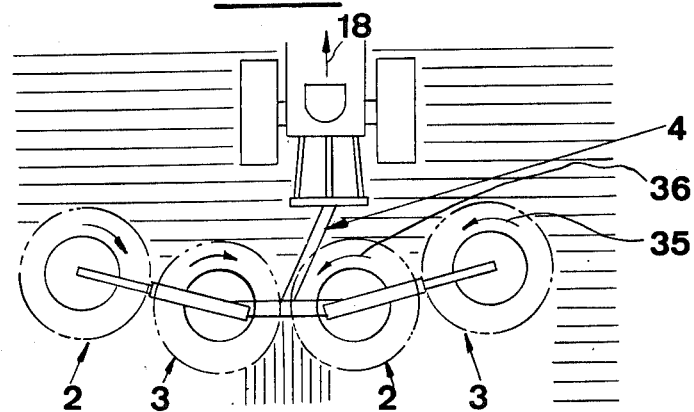

In FIG. 22, a four rotor machine is shown in the windrowing condition for forming one single central windrow. The setting of the machine components is the same as if two twin rotor machines were placed alongside each other and adjusted for the side delivery windrowing condition already described. Obviously the left-hand pair of rotor assemblies is adjusted to deliver the crop material to the right while that of the other part of rotor assemblies is adjusted to deliver the crop material to the left.

In the described embodiments half of the connecting rods 77 are positioned above the carrier plates 37 and the other half positioned below the carrier plates. Of course, it is possible to position all connecting rods either above or below the carrier plates 37. Also in the arrangements shown, ten arms 62 are provided which means that either five or ten planetary gears 68 are required per rotor assembly according to the embodiment concerned. However, arrangements with more or less arms are possible and with an arrangement with only eight arms per rotor assembly, for example, the number of planetary gears can be reduced by one or two units depending on the design involved. In the arrangement according to FIGS. 2 to 9 the cranks 71 would then define an angle of 120°.

From what precedes it will be appreciated that a universal haymaking machine is provided comprising a minimum of components and capable of performing all haymaking operations between the mowing and the baling operation. The rake-tedder according to the present invention is simple in design and reliable in operation with excellent raking characteristics as well as excellent tedding characteristics. Furthermore, a rake-tedder according to the present invention is exempt of any cam and cam follower means in the form of cam rollers, whereby the fast wearing and relatively expensive components have been eliminated. Also rake-tedders according to the invention may be exempt of swath deflectors. To change the machine from its tedding position to its raking position and vice versa only a minimum of adjustments are required which are relatively simple and hence easily accomplished. Thus the risks for improper adjustments are reduced. Finally, the machine according to the invention is in all of its operating conditions a smooth running machine, whereby wear is reduced substantially and machine life thus increased.

Reference is made to copending Patent Application No. 108,322.

Having thus described the invention, what I claim is:

1. A haymaking machine comprising:
    a frame adapted for movement across a field;
    at least one rotor assembly supported by said frame and rotatable about a substantially vertical first axis of rotation;
    a stationary gear means mounted said at least one rotor assembly coaxial with said first axis of rotation;
    a plurality of planetary gears rotatably mounted on said at least one rotor assembly, said planetary gears being cooperably associated with said stationary gear means and rotatable with said at least one rotor assembly about said first axis of rotation, each said planetary gear having a second axis of rotation;
    a plurality of tine assemblies pivotally mounted on said at least one rotor assembly, each said assembly being coupled to one of said planetary gears eccentrically of the corresponding said second axis of rotation, such that during rotation of said at least one rotor assembly each said tine assembly alternates between an extended crop engaging position and a retracted crop releasing position; and
    drive means for rotating said rotor assembly.

2. The haymaking machine of claim 1 wherein said at least one rotor assembly includes a plurality of substantially radially extending arms, each said arm having an outer end spaced from said first axis of rotation supporting at least one of said tine assemblies.

3. The haymaking machine of claim 2 wherein said at least one said rotor assembly further includes a carrier means having an outer circumference substantially concentric with said first axis of rotation, said carrier means rotatably supporting said planetary gears and having said arms mounted thereon adjacent said outer circumference.

4. The haymaking machine of claim 3 wherein said carrier means includes a ring gear coaxial with said first axis of rotation, said drive means including a drive pinion interengageable with said ring gear to rotatably drive said carrier means.

5. The haymaking machine of claim 4 wherein said frame includes a support shaft defining said first axis of rotation, said support shaft having an upper end and a spaced apart lower end, said lower end including a ground engaging wheel, said upper end rotatably supporting said ring gear, said stationary gear means being mounted around said support shaft.

6. The haymaking machine of claim 1 wherein each said tine assembly includes a tine carrier pivotally mounted to said at least one rotor assembly, each said tine carrier including a lower tine mounting portion, said tine assembly further including a tine means supported by said tine mounting portion.

7. The haymaking machine of claim 6 wherein said tine means includes a pair of interconnected oppositely wound coils having a mounting portion therebetween connected to said tine mounting portion and a rake tine extending from each of said coils, said rake tines being positioned in a substantially vertical plane projecting substantially radially from said first axis of rotation during at least a part of the rotation of said at least one rotor assembly.

8. The haymaking machine of claim 7 wherein said lower tine mounting portion of said tine carrier is inclined to said first axis of rotation at an angle of approximately 45°, said tine means projecting substantially perpendicularly to said tine mounting portion.

9. The haymaking machine of claim 6 wherein said stationary gear means comprises a single stationary gear.

10. The haymaking machine of claim 9 wherein said stationary gear and each of said planetary gears includes an equal number of gear teeth.

11. The haymaking machine of claim 9 wherein two of said tine assemblies are pivotally connected to each said planetary gear by spaced apart connecting rods, each said pivot connection on each said planetary gear being annularly spaced from said the other pivot connection and spaced from said second axis of rotation.

12. The haymaking machine of claim 11 wherein each said connecting rod is connected to the corresponding tine assembly eccentrically of the pivot connection between said corresponding tine assembly and said at least one rotor assembly.

13. The haymaking machine of claim 12 wherein the eccentricity of the pivot connection between the connecting rod and the tine assembly relative to the pivotal mounting of the tine assembly on said at least one rotor assembly is greater than the eccentricity of the pivotal connection between the connecting rod and the association planetary gear relative to said corresponding second axis of rotation such that upon rotation of said associated planetary gear the tine assembly pivots about the pivot connection on said at least one rotor assembly between first and second extreme positions, said first extreme position being substantially radially outwardly from said first axis of rotation.

14. The haymaking machine of claim 13 wherein said tine assembly further includes a mounting arm pivotally connected to said connecting rod, said mounting arm having means for permitting pivotal connection with said mounting arm at a plurality of positions along said mounting arm.

15. The haymaking machine of claim 13 wherein said connecting rods are detachable from said planetary gears, said at least one rotor assembly further including fixed coupling means for connection to said detachable connecting rods to lock said tine means in said first extreme position.

16. The haymaking machine of claim 6 wherein said stationary gear means comprises first and second stationary gears, said first stationary gear being positioned coaxially above said second stationary gear.

17. The haymaking machine of claim 16 wherein each planetary gear is connected to one tine assembly, half of said planetary gears being operatively associated with said first stationary gear, the remaining half of said planetary gears being operatively assocated with said second stationary gear, adjacent tine assemblies being coupled to planetary gears operatively associated with different stationary gears.

18. The haymaking machine of claim 17 wherein each said stationary gear and each of said associated planetary gears includes an equal number of gear teeth, such that each said planetary gear makes one revolution about said corresponding second axis of rotation for each revolution with said at least one rotor assembly about said first axis of rotation.

19. The haymaking machine of claim 18 wherein each said tine assembly is coupled to an associated planetary gear by a connecting rod pivotally attached to both said tine assembly and said associated planetary gear, said pivotal connection with said associated planetary gear being at a predetermined distance from said second axis of rotation, said pivotal connection with said tine assembly being selectively positionable in a plurality of positions relative to said pivot connection between said tine assembly and said at least one rotor assembly, each of said plurality of positions being spaced from said pivot connection between said tine assembly and said rotor assembly at a distance greater than said predetermined distance.

20. The haymaking machine of claim 13 or 19 where said at least one rotor assembly further includes locking means for locking each said planetary gear relative to said at least one rotor assembly to prevent said planetary gears from rotating about their respective second axis of rotation such that said planetary gears rotate in unison with said at least one rotor assembly and locks said tine means into a position relative to said at least one rotor assembly.

21. The haymaking machine of claim 20 wherein said stationary gear means includes a latch means for selectively locking said stationary gear means into a stationary position relative to said at least one rotor assembly or permitting angular adjustment or rotational movement of said stationary gear means independent of said at least one rotor assembly.

22. The haymaking machine of claim 13 or 19 further comprising at least one pair of rotor assemblies, each rotor assembly of said at least one pair being rotatable in opposite directions.

23. The haymaking machine of claim 22 wherein one rotor assembly of said at least one pair includes a drive reversing means for selectively permitting both rotor assemblies of said at least one pair to rotate in the same direction.

24. The haymaking machine of claim 23 wherein said frame includes a transverse beam supporting said at least one pair of rotor assemblies, said transverse beam being angularly adjustable to selectively position one rotor assembly of said at least one pair either forward of, rearward or or in side-by-side relationship with the other rotor assembly of said at least one pair.

* * * * *